US012066939B2

(12) United States Patent
Shah et al.

(10) Patent No.: US 12,066,939 B2
(45) Date of Patent: Aug. 20, 2024

(54) CACHE LINE DEMOTE INFRASTRUCTURE FOR MULTI-PROCESSOR PIPELINES

(71) Applicant: Intel Corporation, Santa Clara, CA (US)

(72) Inventors: Rahul R. Shah, Chandler, AZ (US); Omkar Maslekar, Chandler, AZ (US); Priya Autee, Chandler, AZ (US); Edwin Verplanke, Chandler, AZ (US); Andrew J. Herdrich, Hillsboro, OR (US); Jeffrey D. Chamberlain, Tracy, CA (US)

(73) Assignee: Intel Corporation, Santa Clara, CA (US)

( * ) Notice: Subject to any disclaimer, the term of this patent is extended or adjusted under 35 U.S.C. 154(b) by 690 days.

(21) Appl. No.: 17/086,243

(22) Filed: Oct. 30, 2020

(65) Prior Publication Data

US 2021/0073129 A1    Mar. 11, 2021

(51) Int. Cl.
*G06F 12/00* (2006.01)
*G06F 9/30* (2018.01)
*G06F 12/0811* (2016.01)
*G06F 12/084* (2016.01)
*G06F 12/1009* (2016.01)

(52) U.S. Cl.
CPC ...... *G06F 12/0811* (2013.01); *G06F 9/30047* (2013.01); *G06F 9/30079* (2013.01); *G06F 12/084* (2013.01); *G06F 12/1009* (2013.01)

(58) Field of Classification Search
CPC ............ G06F 12/0811; G06F 9/30047; G06F 9/30079; G06F 12/084; G06F 12/1009; G06F 12/126; G06F 9/3555

USPC ........................................................ 711/154
See application file for complete search history.

(56) References Cited

U.S. PATENT DOCUMENTS

| 10,019,360 B2 | 7/2018 | Wang et al. |
| 10,564,972 B1 * | 2/2020 | Doshi ................. G06F 9/30145 |
| 10,657,056 B2 | 5/2020 | Tamir et al. |

(Continued)

FOREIGN PATENT DOCUMENTS

WO    2016106128 A1    6/2016

OTHER PUBLICATIONS

McCalpin, John, D., "Intel's future "CLDEMOTE" instruction", https://sites.utexas.edu/jdm4372/2019/02/18/intels-future-cldemote-instruction/, Posted by John D. McCalpin, Ph.D. on Feb. 18, 2019, 3 pages.

(Continued)

*Primary Examiner* — Mardochee Chery
(74) *Attorney, Agent, or Firm* — Compass IP Law PC

(57) ABSTRACT

Examples described herein relate to a manner of demoting multiple cache lines to shared memory. In some examples, a shared cache is accessible by at least two processor cores and a region of the cache is larger than a cache line and is designated for demotion from the cache to the shared cache. In some examples, the cache line corresponds to a memory address in a region of memory. In some examples, an indication that the region of memory is associated with a cache line demote operation is provided in an indicator in a page table entry (PTE). In some examples, the indication that the region of memory is associated with a cache line demote operation is based on a command in an application executed by a processor. In some examples, the cache is an level 1 (L1) or level 2 (L2) cache.

21 Claims, 17 Drawing Sheets

(56) References Cited

U.S. PATENT DOCUMENTS

| | | |
|---|---|---|
| 2016/0179681 A1 | 6/2016 | Greenspan et al. |
| 2016/0342517 A1 | 11/2016 | Shum et al. |
| 2017/0116120 A1 | 4/2017 | Shum et al. |
| 2018/0095880 A1* | 4/2018 | Doshi .................. G06F 9/3004 |
| 2019/0042417 A1 | 2/2019 | Sukhomlinov et al. |
| 2019/0042419 A1 | 2/2019 | Tamir et al. |
| 2019/0102303 A1* | 4/2019 | Wang ................. G06F 12/0862 |
| 2020/0233664 A1 | 7/2020 | Wang et al. |
| 2020/0285578 A1 | 9/2020 | Wang et al. |
| 2021/0073129 A1 | 3/2021 | Shah et al. |
| 2021/0141736 A1* | 5/2021 | Manzanares .......... G06F 3/0656 |

OTHER PUBLICATIONS

International Search Report and Written Opinion for PCT Patent Application No. PCT/US21/51360, Mailed Jan. 3, 2022, 10 pages.

* cited by examiner

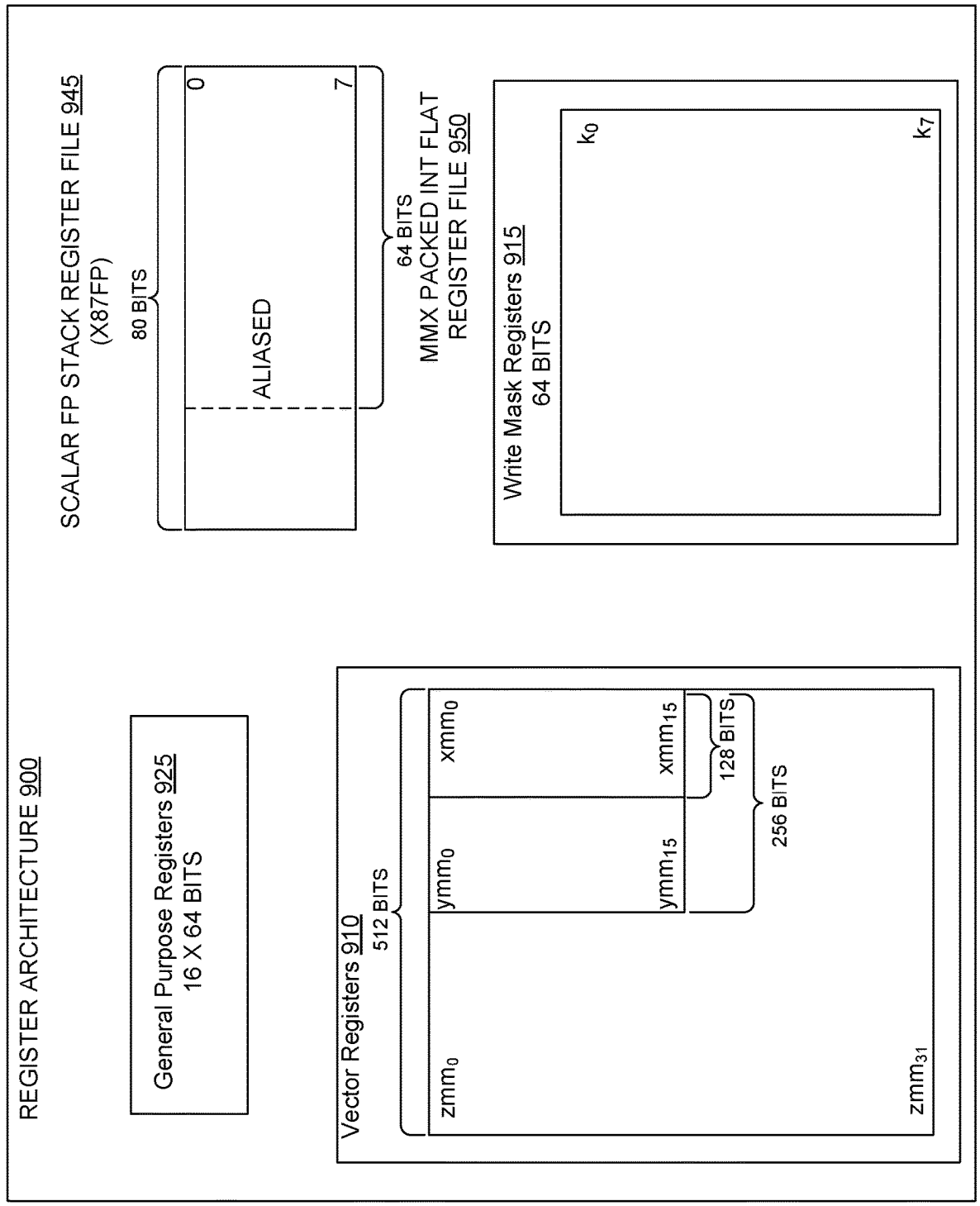

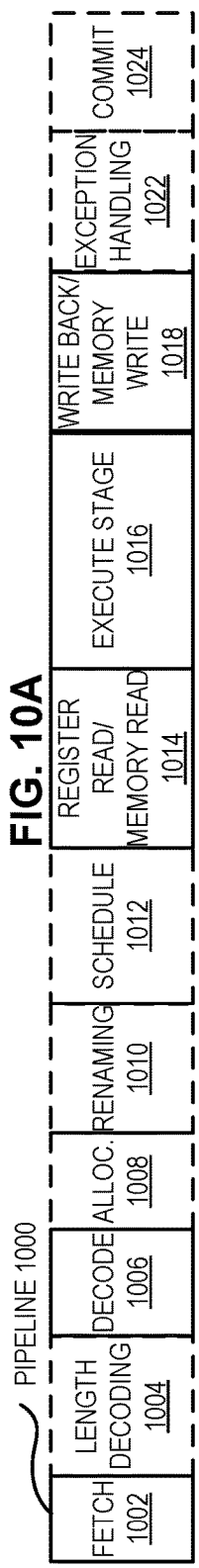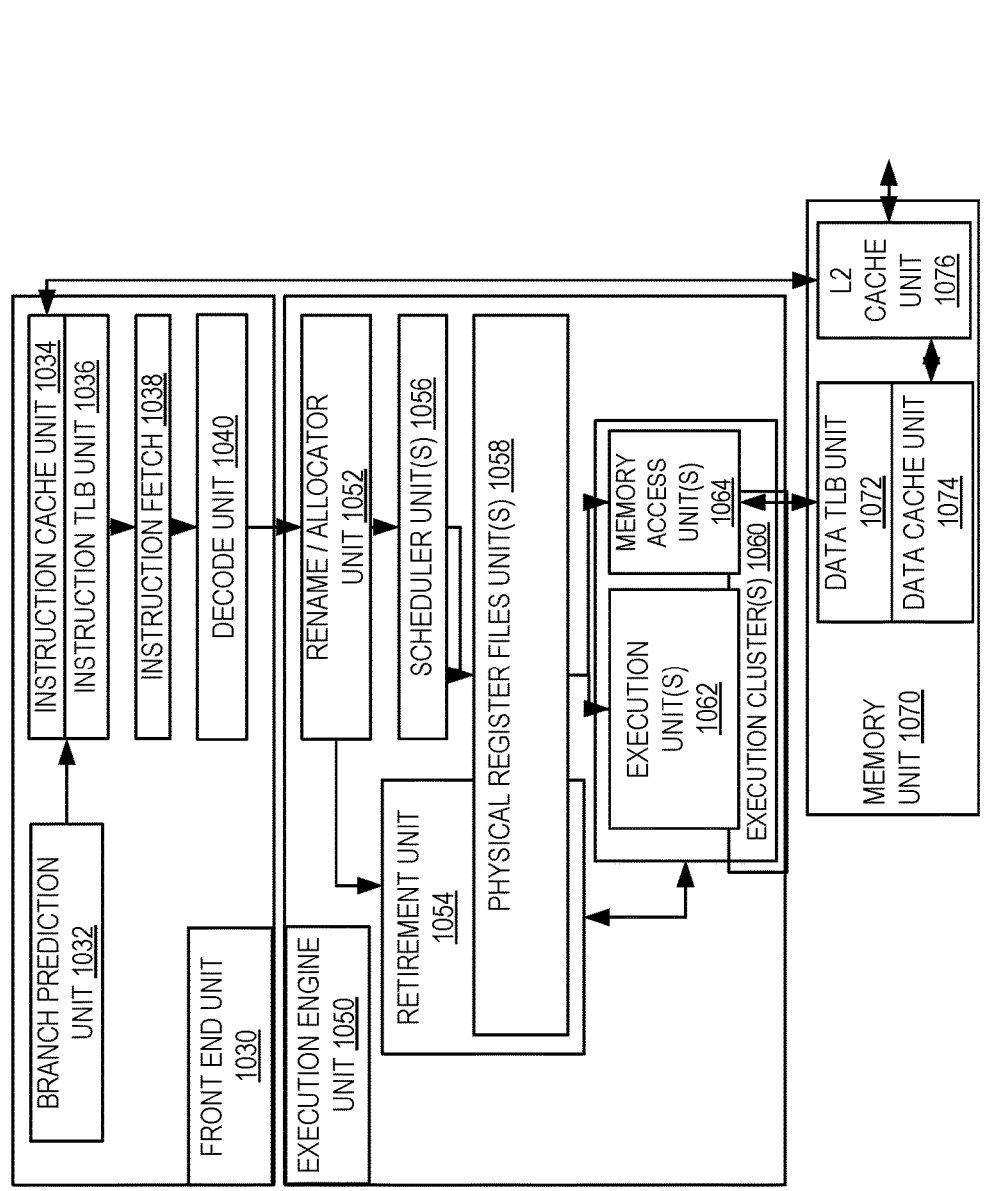

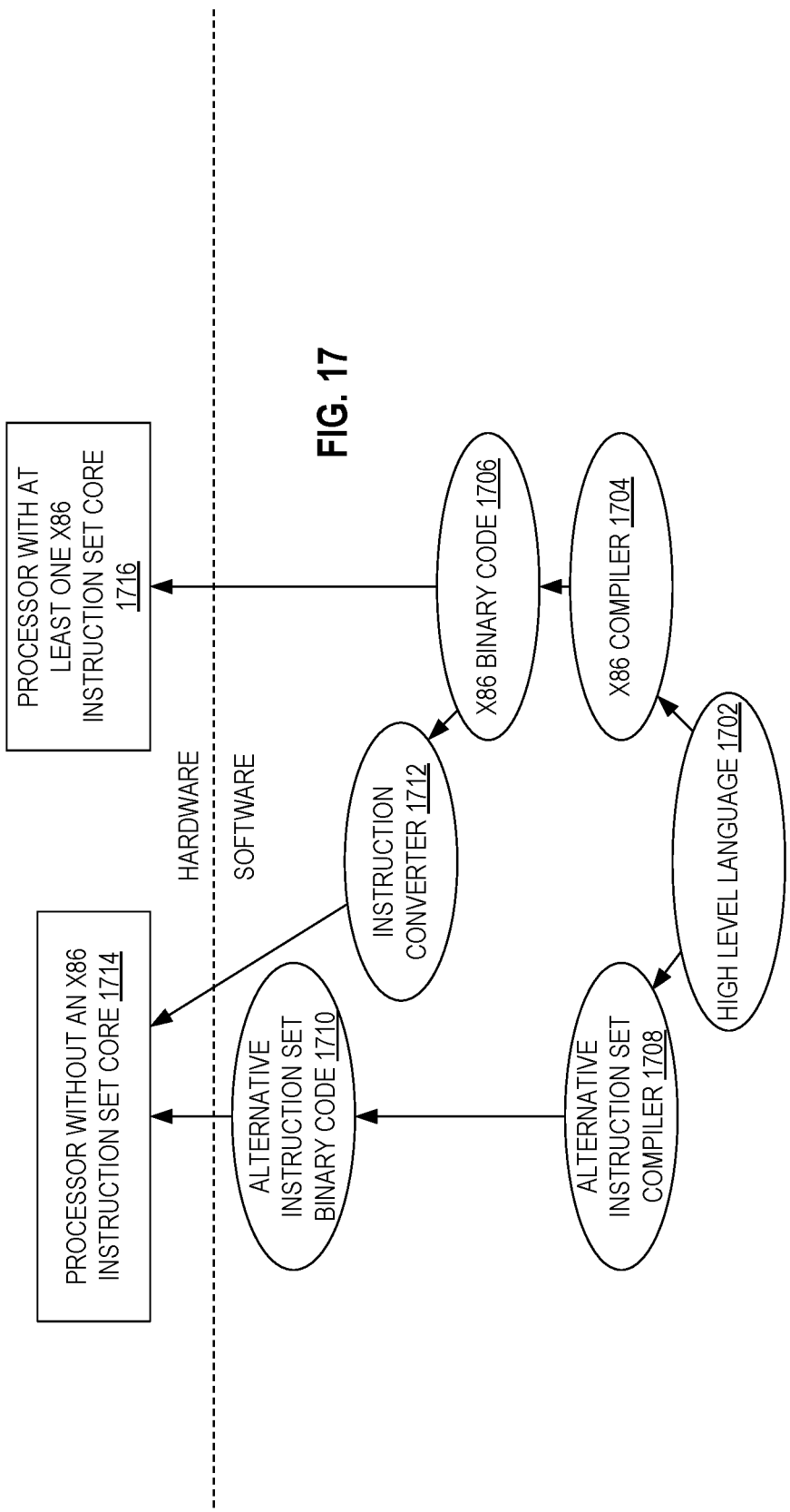

CACHE LINE DEMOTE INFRASTRUCTURE FOR MULTI-PROCESSOR PIPELINES

Modern servers provide large compute capacity by increasing the number of cores per socket. To take advantage of this compute capacity, some workloads execute in a pipeline model where microservices run in parallel or perform serial processing on different cores. A pipeline model of execution allows flexibility to scale a particular stage or stages within the pipeline when needed to keep up with the incoming workload. In the pipeline model of execution, distribution of the workload occurs within the given number of cores for a stage and also between the different stages. Core-to-core communication can become a bottleneck that limits performance of the pipeline model.

BRIEF DESCRIPTION OF THE DRAWINGS

FIG. 9 is a block diagram of a register architecture according to one embodiment.
FIG. 10A is a block diagram illustrating both an exemplary in-order pipeline and an exemplary register renaming, out-of-order issue/execution pipeline according to some embodiments.
FIG. 10B is a block diagram illustrating both an exemplary embodiment of an in-order architecture core and an exemplary register renaming, out-of-order issue/execution architecture core to be included in a processor according to some embodiments.
FIG. 11A is a block diagram of a single processor core, along with its connection to the on-die interconnect network and with its local subset of the Level 2 (L2) cache, according to some embodiments.
FIG. 11B is an expanded view of part of the processor core in FIG. 11A according to some embodiments.
FIG. 13 shown a block diagram of a system in accordance with some embodiments.
FIG. 14 is a block diagram of a first more specific exemplary system in accordance with some embodiment.
FIG. 15 is a block diagram of a second more specific exemplary system in accordance with some embodiments.
FIG. 16 is a block diagram of a System-on-a-Chip (SoC) in accordance with some embodiments.
FIG. 17 is a block diagram contrasting the use of a software instruction converter to convert binary instructions in a source instruction set to binary instructions in a target instruction set according to some embodiments.

DETAILED DESCRIPTION

In some implementations, a producer core obtains a copy of data from the data level 1 (L1) cache after checking the availability of a fill buffer. Since this operation requires a MISS signal from an attempt to access content from L1 cache, a copy is marked as exclusive. On the consumer side, a cache controller can issue a snoop request for which an uncore detects that a requested line is currently owned by the producer core. After completion of the snoop request, the line is marked as shared. Invalidate signals are issued by both the producer and consumer cores to access the line in the next period. Movement of content of a cache line from a producer's L1 data cache to the last level shared cache can occur in the event of a snoop request.

In a read cycle, if a core does not find the data in the L1 data cache, a MISS signal is issued, and a request for the data is sent to the next level of cache. This operation requires the availability of the fill buffer. In case it is available, fill buffers are issued, and data is brought back into fill buffers. But in the case, there are no fill buffers available, the load gets blocked, and the operation is marked as to be re-issued later.

A cache line demote (e.g., Intel® CLDEMOTE) instruction can be executed to opportunistically demote content of a cache line (e.g., 64 Bytes) into a shared last level cache. The cache line demote instruction can save the infrastructure from snooping the data to be accessed by a core in a next stage. In some cases, a snoop cycle, involving retrieving data from a previous core stage, can be skipped by use of a cache line demote instruction. The cycles saved from performing a snoop cycle can be substantial for a communications workload, where the incoming data rate is in terms of million packets per second, and the infrastructure usage and time to available of data for processing can be reduced.

The application developer strategically decides which cache line(s) will be shared by the next pipeline stage (e.g., core) and demotes content to shared cache to be processed by a stage for access by a next pipeline stage. The application developer inserts the cache line demote instruction into the application for execution on particular data. If the data is spread across multiple cache lines, e.g., if the data exceeds 64 Bytes, then the cache line demote instruction is applied multiple times for execution for each cache line. In short, the onus is on the application developer to take advantage of this instruction and to decide when to cause content to be demoted to a shared cache.

Figure 1:
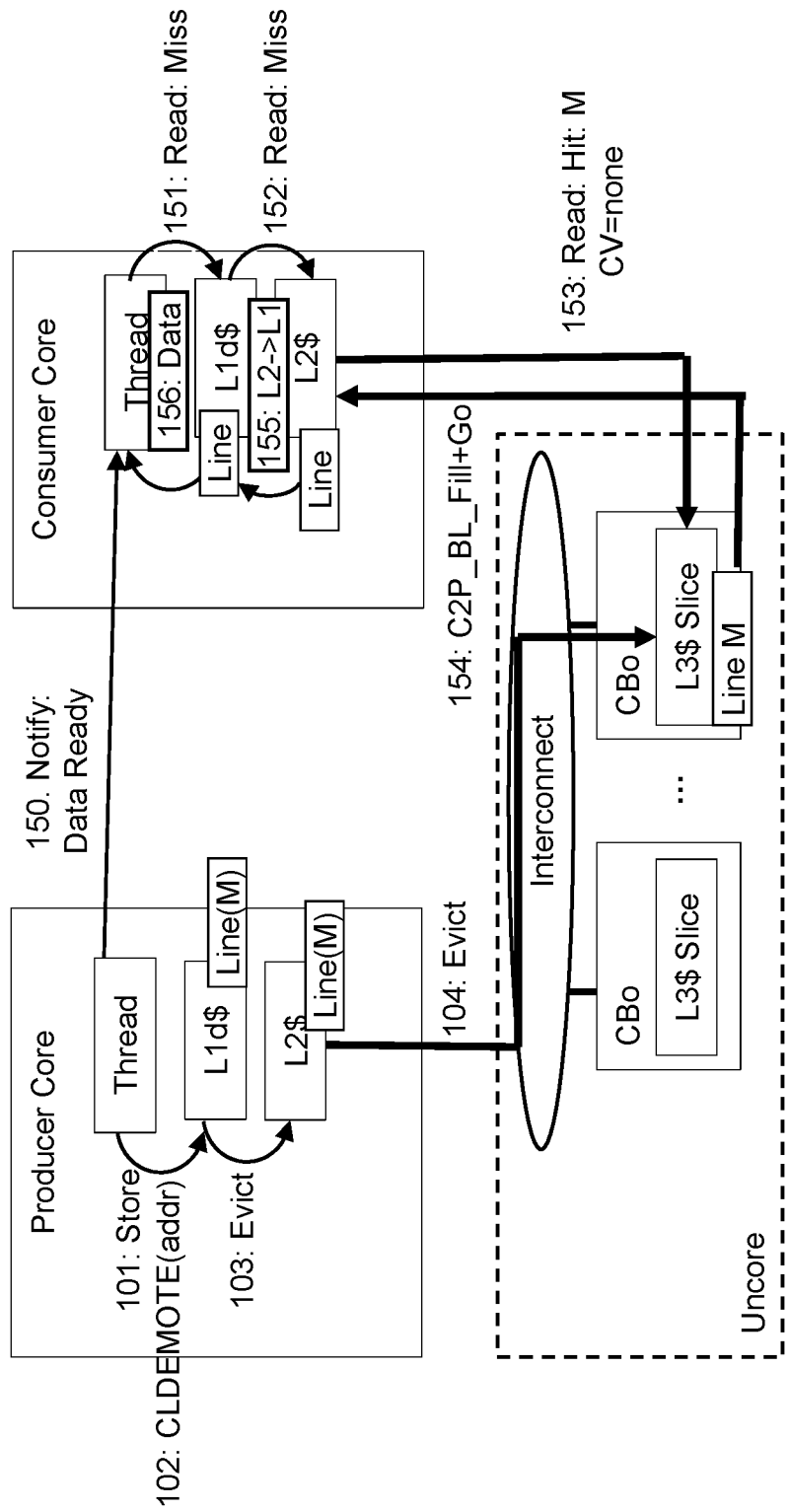
FIG. 1 depicts an example operation of a system.

FIG. 1 depicts an example of a cache line demotion operation. The following are examples of operation of a producer core in connection with execution of CLDEMOTE of an application. At 101, a producer core can execute an application in a thread and issue a store request to store the processed data into a cache line (M) of a cache (e.g., level 1 (L1) data cache (d$)). At 102, execution of the Cache Line Demote instruction (e.g., CLDEMOTE) takes an address (e.g., 64 byte aligned) as an input, an uncore registers this address and the uncore opportunistically demotes content of a cache line associated with the address (e.g., cache line (M)) to the last level cache. At 103, the uncore performs the Cache Line Demote instruction to demote data from L1 cache associated with line (M) to level 2 (L2) cache. At 104, the uncore evicts content associated with line (M) from L2 cache to shared level 3 (L3) cache. At 150, a thread on the producer core finishes execution and notifies a second (consumer) core that data is available to process and a thread executing on a (second) consumer core receives a notification that data is ready.

The following are examples of operation of a consumer core. After demoting data to last level cache, a snoop request is issued by an uncore to find the line in the last shared level. At 151, the thread executing on a (second) consumer core reads data from its L1 data cache corresponding to data processed by the producer core, but a cache miss occurs. At 152, the thread executing on the consumer core reads data from its L2 cache to retrieve the data processed by the producer core, but a second cache miss occurs. At 153, the thread executing on the consumer core reads data from the shared L3 cache to retrieve the data processed by the producer core. The L3 cache can be accessible by both producer and consumer cores. At 154, the data is copied to L2 cache and, at 155, the data is copied to L1 data cache. At 156, the thread executing on the consumer core processes data from the L1 data cache. Accordingly, cores can implement pipelined operations using a shared cache and cache line demote instruction. In addition, cross-core snoops are costly operations and increase latency of data processing.

However, use of a cache line demote instruction requires that a developer manually include the command into an application. In some cases, user-level applications, if not pinned to instruction cache, may result in cache line demote instruction overhead where a sibling hardware thread can concur penalty of losing cache locality in that cache data remains with a previous core and new sibling thread needs to retrieve the data. In some cases, applications such as data plane packet processing requires a memory buffer holding the pointer to the packet data to be spanned over a single cache line. In such case, multiple cache line demotion instructions are required to be issued for each cache line to pass content of the memory buffer to the next core in the pipeline.

Various embodiments provide an instruction and system that provide cache line demotion and take responsibility off of an application developer to specify cache line demotion operations for content of every cache line. Various embodiments provide a flexible specification of size of a cache (e.g., specification of a number of cache lines or associated memory addresses or memory address range) to demote to a cache or memory shared by multiple cores or processors. For example, a size of cache demoted can range from one cache line currently to a memory page or other sizes. Accordingly, for some embodiments, a software developer or application does not need to issue a cache line demotion request for each cache line of data or specify a number of cache lines data or identify the cache lines whose content is to be demoted to a shared cache. Various embodiments provide an extension to an x86 compatible CLDEMOTE instruction set architecture (ISA).

Some versions of a cache line demote instruction receive an address (e.g., 64 byte aligned) as an input and an uncore (or system agent) registers this address and opportunistically demotes content of the cache line associated with the address to a last level cache that is accessible by multiple cores. Various embodiments provide an instruction that enables a block of memory addresses to be subject to cache line demotion. For example, the cache line demote instruction can apply to a block of addresses corresponding to one or more cache lines and cause content from the cache lines to be demoted to shared last level cache.

For example, a format of a cache line demote instruction can be as follows.

ENB_CLDEMOTE [addr] [depth]

A memory region cache demotion instruction in accordance with various embodiments can allow for specification of a virtual or physical address in field [addr] and an amount of content in field [depth] (e.g., number of bytes or kilobytes (or other byte increments) following the address in field [addr]). According to some embodiments, a specified amount of content in a region of cache is to be demoted to a shared cache if any of the content in the region is updated by a core. The memory region can start at a starting memory address specified in field [addr] and include addressable regions up including an offset specified in field [depth] after the starting address. For example, if field [addr] starts at 0x40008000 and field [depth] is 0x100, then content in the cache stored in the memory region corresponding to addresses 0x40008000 to 0x40008100 can be demoted to shared cache if any of the region is updated by a core. Any size of region can be specified to be demoted such as a page (e.g., 64 bytes to 8192 bytes or other sizes). Various embodiments of the cache demote instruction can eliminate a need to issue a cache line demote instruction per cache line and save instruction execution and instruction retirement cost. Some examples of the cache line demote instruction can cause copying of contents of multiple cache lines to a shared cache or memory in response to any update of any of the multiple cache lines. Some examples of the cache line demote instruction can cause eviction of contents of the multiple cache lines to a shared cache or memory in response to on any update of any of the multiple cache lines.

Using a memory region cache demote instruction, a developer can indicate that a region of memory is subject to cache line demotion. In some cases, any modification of content in a cache line that is associated with the region of memory can cause demotion or copying of the content to a shared cache or memory. In some cases, any modification of content in a cache line that is associated with the region of memory can cause copying of the content to a shared cache or memory while retaining the content in the L1 or L2 cache. A developer can include one or more instances of the cache region demotion instruction in source code of an application to cause data stored in particular cache lines to be evicted or copied to shared cache. In some examples, a compiler could compile an application and inject machine executable versions of the cache region demotion (e.g. opcode) into an executable version of the application. In some examples, micro-operations or microcode address instructions perform the cache region monitoring and demotion to shared cache.

In some examples, eviction of contents of a cache can be based on schemes such as least recently used (LRU) and a number of cache lines subject to cache line demotion. For example, a higher number of cache lines that are least recently used and subject to cache line demotion are more likely to be evicted from the cache to shared cache or memory than a lower number of cache lines that are more recently used.

An uncore or system agent can apply memory region cache demotion to content associated with an address in a memory region that is stored in an L1 or L2 cache and identified by the cache demote instruction. In some examples, an operating system (OS) can associate the region of the cache with an addressable memory range that is to store data to be processed by a pipeline and if an application writes or stores data to the cache associated with the addressable memory range, the uncore or system agent can automatically evict or copy content of the cache associated with the addressable memory range to shared cache. In some examples, the content of the cache associated with the addressable memory range to shared cache can be marked for eviction and also copied to the shared cache.

Execution of a store instruction to a region of an L1 or L2 cache associated with a memory address region specified in a cache line demote instruction can cause the core to demote content of the cache line by execution of microcode that checks if a translation lookaside (TLB) page table entry for the memory address region indicates a cache demote is to be performed. Where the addresses are tagged, if there are any updates to the address which is tagged by the user at the time of allocation, content of the cache associated with the address can be automatically be demoted by the microcode. In other words, the core can issue a cache line demote instruction if a page table entry for the address indicates the address is subject to cache line demotion.

The memory region subject to cache line demotion can be specified at time of the memory allocation. In some examples, time of memory allocation can occur at TLB page table entry (PTE) creation. An operating system (OS) can create a PTE for the memory region and specify in the PTE that the memory region is subject to cache line demotion. For example, when a bit or bits or flag are enabled in a PTE that indicate that the memory region is subject to cache line demotion, a core can execute microcode or perform logic such that when the core detects a store to certain address associated with the cache, the core can demote or copy data from the cache to shared cache or memory. A demotion or copying of data can occur after data has been processed by an application. In some examples, an indication that the memory region is subject to cache line demotion can be written to a register.

A TLB entry can include a PTE. At time of memory allocation, a PTE can be created for a memory region. In some examples, a PTE attribute can define a memory type used to access, user/supervisor mode and many other attributes along with a physical address of a memory region (e.g., 4 KB page) referenced by the PTE. Based on application of cache demotion to a memory region, the PTE can indicate that ENB_CLDEMOTE is to be used or not used. In some examples, an OS can manage TLBs and created one or more PTEs for an application. In some examples, a page table entry in the TLB can have an attribute called ENB_CLDEMOTE (e.g., demotion is enabled for this range of memory addresses) and this attribute can be included by command of the application issuing the instruction.

The following Table 1 provides an example of a format of a page table entry based on Intel® Software Developer's Manual (SDM) 4-26 Vol. 3A.

TABLE 1

Example Format of a 4-Level Page-Directory Entry that References a Page Table

| Bit Position(s) | Contents |
|---|---|
| 0 (P) | Present; must be 1 to reference a page table |
| 1 (R/W) | Read/write; if 0, writes may not be allowed to the 2-MByte region controlled by this entry |
| 2 (U/S) | User/supervisor; if 0, user-mode accesses are not allowed to the 2-MByte region controlled by this entry |
| 3 (PWT) | Page-level write-through; indirectly determines the memory type used to access the page table referenced by this entry |
| 4 (PCD) | Page-level cache disable; indirectly determines the memory type used to access the page table referenced by this entry |
| 5 (A) | Accessed; indicates whether this entry has been used for linear-address translation |
| 6 | ENABLE_REGION_BASED_CLDEMOTE |
| 7 (PS) | Page size; must be 0 (otherwise, this entry maps a 2-MByte page; see Table 4-17) |
| 11:8 | Ignored |
| (M-1):12 | Physical address of 4-KByte aligned page table referenced by this entry |
| 51:M | Reserved (must be 0) |
| 62:52 | Ignored |
| 63 (XD) | If IA32_EFER.NXE = 1, execute-disable (if 1, instruction fetches are not allowed from the 2-MByte region controlled by this entry); otherwise, reserved (must be 0) |

A field ENABLE_REGION_BASED_CLDEMOTE (e.g., bit 6) can be used to indicate whether content in a cache associated with a memory address region in the PTE is to be demoted after a store request from a processor.

Table 2 depicts another example format of a portion of a page table entry. The page table entry can include at least information on a range of memory addresses for which a cache demote operation is to occur.

TABLE 2

| | |
|---|---|
| Starting memory address | Starting memory address for which cache demote is to take place |
| Ending memory address | Ending memory address for which cache demote is to take place |
| ENABLE_REGION_BASED_CLDEMOTE | Indicates whether the cache demote is to be enabled for the region of memory specified by the starting and ending memory addresses |

Figure 2:
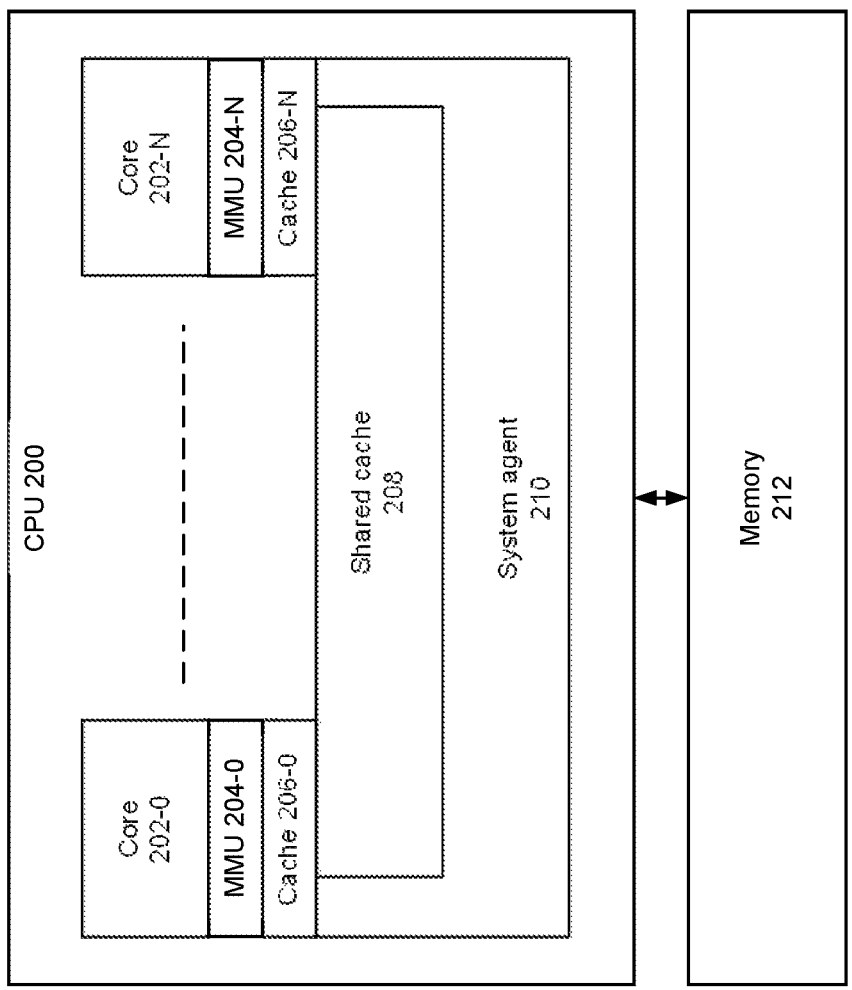
FIG. 2 depicts an example system.

FIG. 2 depicts an example system. The system can be implemented as a server, rack of servers, racks of servers, computing platform, or others. In some examples, cores 202-0 to 202-N (where N is an integer) can include one or more of: a core, graphics processing unit (GPU), field programmable gate array (FPGA), or application specific integrated circuit (ASIC). In some examples, a core can be sold or designed by Intel®, ARM®, AMD®, Qualcomm®, IBM®, Texas Instruments®, among others. Cores 202-0 to 202-N can execute an operating system, driver, applications, and/or a virtualized execution environment (VEE). In some examples, an operating system (OS) can be Linux®, Windows®, FreeBSD®, Android®, MacOS®, iOS®, or any other operating system. For simplicity, only two cores are shown, but more than two cores can be used.

An uncore or system agent 210 can include or more of a memory controller, a shared cache (e.g., last level cache (LLC)), a cache coherency manager, arithmetic logic units, floating point units, core or processor interconnects, Caching/Home Agent (CHA), or bus or link controllers. In some examples, CHA of cores can be configured with a number of cache lines and associated memory addresses that are subject to cache line demotion, as described herein, and the CHA can snoop for changes to any content of a number of cache lines and associated memory addresses that are subject to cache line demotion to maintain cache or memory coherency.

System agent 210 can provide one or more of: direct memory access (DMA) engine connection, non-cached coherent master connection, data cache coherency between cores and arbitrates cache requests, or Advanced Microcontroller Bus Architecture (AMBA) capabilities.

For example, applications executed by any core can include a service, a microservice, cloud native microservice, workload, or software. Applications can be executed in a pipelined manner whereby a core executes an application and the application provides data for processing or access by another core. According to some embodiments, an application can execute on one or multiple cores or processors and the application can allocate a block of memory that is subject to cache line demotion as described herein.

Any application can perform packet processing based on one or more of Data Plane Development Kit (DPDK), Storage Performance Development Kit (SPDK), OpenDataPlane, Network Function Virtualization (NFV), software-defined networking (SDN), Evolved Packet Core (EPC), or 5G network slicing. Some example implementations of NFV are described in European Telecommunications Standards Institute (ETSI) specifications or Open Source NFV Management and Orchestration (MANO) from ETSI's Open Source Mano (OSM) group. A virtual network function (VNF) can include a service chain or sequence of virtualized tasks executed on generic configurable hardware such as firewalls, domain name system (DNS), caching or network address translation (NAT) and can run in VEEs. VNFs can be linked together as a service chain. In some examples, EPC is a 3GPP-specified core architecture at least for Long Term Evolution (LTE) access. 5G network slicing can provide for multiplexing of virtualized and independent logical networks on the same physical network infrastructure. Some applications can perform video processing or media transcoding (e.g., changing the encoding of audio, image or video files).

A virtualized execution environment (VEE) can include at least a virtual machine or a container. A virtual machine (VM) can be software that runs an operating system and one or more applications. A VM can be defined by specification, configuration files, virtual disk file, non-volatile random access memory (NVRAM) setting file, and the log file and is backed by the physical resources of a host computing platform. A VM can include an operating system (OS) or application environment that is installed on software, which imitates dedicated hardware. The end user has the same experience on a virtual machine as they would have on dedicated hardware. Specialized software, called a hypervisor, emulates the PC client or server's CPU, memory, hard disk, network and other hardware resources completely, enabling virtual machines to share the resources. The hypervisor can emulate multiple virtual hardware platforms that are isolated from each other, allowing virtual machines to run Linux®, Windows® Server, VMware ESXi, and other operating systems on the same underlying physical host.

A container can be a software package of applications, configurations and dependencies so the applications run reliably on one computing environment to another. Containers can share an operating system installed on the server platform and run as isolated processes. A container can be a software package that contains everything the software needs to run such as system tools, libraries, and settings. Containers are not installed like traditional software programs, which allows them to be isolated from the other software and the operating system itself. The isolated nature of containers provides several benefits. First, the software in a container will run the same in different environments. For example, a container that includes PHP and MySQL can run identically on both a Linux® computer and a Windows® machine. Second, containers provide added security since the software will not affect the host operating system. While an installed application may alter system settings and modify resources, such as the Windows registry, a container can only modify settings within the container.

Memory management units (MMUs) 204-0 to 204-N can be used by respective cores 202-0 to 202-N to manage memory accesses and storage of content from memory 212 to a cache (e.g., cache 206-0 to 206-N or shared cache 208). MMUs 204-0 to 204-N can perform virtual memory management, memory protection, cache control, bus arbitration and so forth. In accordance with various embodiments, MMUs 204-0 to 204-N can access a TLB to determine whether any memory region is subject to cache line demotion. For example, where a cache line demotion instruction refers to a region of memory addresses, a MMU can tag a region of memory as subject to cache line demotion by use of a bit or flag in a page table entry for that page of memory (e.g., particular length of contiguous block of memory).

Any cache can be a direct mapped cache whereby a cache is organized into multiple sets with a single cache line per set and contents of an address of the memory block can occupy a single cache line. Any cache can be a fully-associative cache whereby a cache can be organized into a single cache set with multiple cache lines and a memory block can occupy any of the cache lines. Any cache can be a set-associative cache and can include one or more cache ways. A cache way can be associated with an address to actual data fetched from a main memory (e.g., a tag), and a data block (e.g., a cache line that contains data fetched from the main memory). Some or all of the cache lines, sets, or ways in a cache set can be subject to cache line demotion as described herein.

Memory 212 can be any type of volatile, non-volatile, or persistent memory that can store or read and provide data. Content of memory addresses associated with memory 212 can be stored in cache for processing. Content of memory addresses associated with memory 212 can be subject to cache line demotion.

Figure 3:
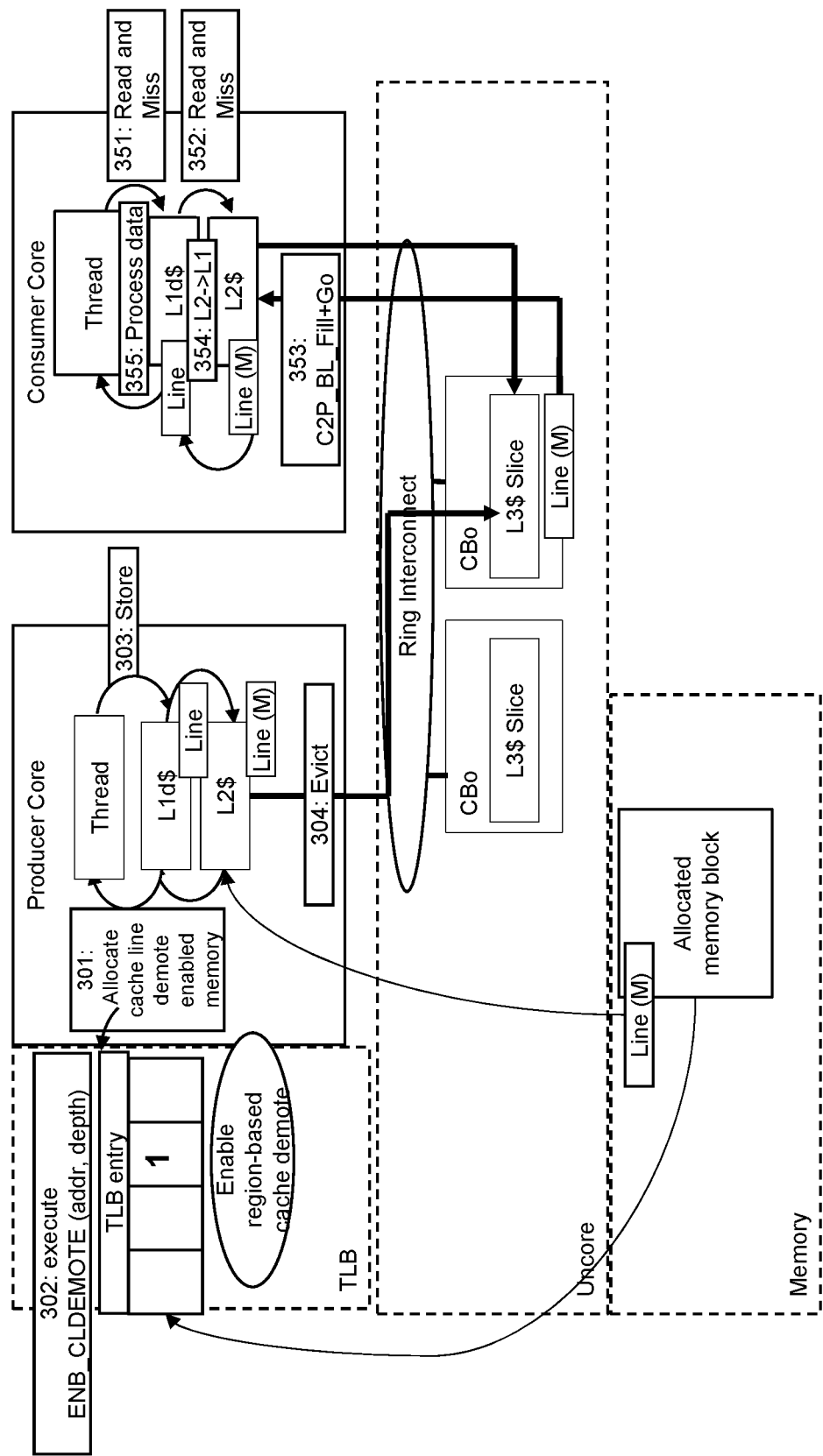
FIG. 3 depicts an example operation of a system.

FIG. 3 depicts an example operation of a system. For example, the system can execute an application that causes allocation of a region of memory to be subject to a cache demote operation if any content of cache associated with the region of memory is updated. In other examples, a requester is a device such as an accelerator or processor or software such as an operating system, orchestrator, or hypervisor. At 301, a thread executing an application can execute an instruction to allocate a region of memory that is subject to cache line demotion. For example, the instruction can take a format of ENB_CLDEMOTE (addr, depth) as described herein. At 302, execution of the instruction can take place to create an entry in a TLB (e.g., page table entry) that indicates that for an address range identified by the cache line demotion instruction, any change of content in the cache corresponding to the address range is to be demoted or copied to a shared cache. A CLDEMOTE tag can be associated with all the addresses in the address to length of block specified by ENB_CLDEMOTE (addr, depth). The application can issue this instruction at the time of memory allocation for a pipeline operation or application. When an application requests memory allocation, the application is configured to share data with different cores in the system, and the application can enable the CLDEMOTE flag in a TLB entry using the cache line demotion instruction. An uncore can add an attribute called ENB_CLDEMOTE to the page table entry corresponding to these memory addresses. The page table entry can be accessed to convert virtual addresses to physical addresses in memory to determine a physical address in a memory device to access for a read or write operation issued by an application. Accordingly, a thread executing an application on a producer core that generates data may not need to issue cache line demote instructions explicitly for each cache line worth of content.

At 303, a thread of the producer core can store processed data into a data cache (e.g., L1 data cache). When a producer core reads content from memory for the first time, content can be stored in a cache line in the core's cache. For example, when an application accesses a region of the memory that is subject to a cache line demotion instruction, an MMU can tag the region of memory as subject to cache line demotion by use of a bit or flag in a page table entry for a region of memory addresses. When the core next writes or updates the cache line subject to cache line demotion, the uncore can demote content from the cache line to a shared cache. In a case where the stored data is associated with a memory region subject to the cache line demotion instruction, the core can cause content in the cache, associated with a memory region subject to the cache line demotion instruction, to be demoted to L2 cache or other cache.

At 304, the producer core can cause the content to be copied to cache shared with another core, such as a consumer core. For example, the producer core can execute microcode that causes demotion of content written to cache to shared cache if the content is written to a region of the cache subject to cache line demotion based on a cache demote tag in the corresponding page table entry. Hardware (e.g., uncore) can opportunistically copy data for any address from a block or region of memory identified in the page table entry, that is subject to cache line demotion, to a shared cache.

At 351, the consumer core can read the L1 data cache and experiences a cache miss as the data is not present in the L1 data cache. At 352, the consumer core can read the L2 cache and experiences a cache miss as the data is not present in the L2 cache. At 353, the consumer core can request content from shared cache and the content can be copied to L2 cache. At 354, the content can be copied from L2 cache to L1 data cache. At 355, a thread executed by the consumer core can process the data from L1 data cache. Note that the consumer core can also act as a producer core for another core, which executes a thread to consume data generated by the producer core. Operation of the application executed by a thread of the consumer core can follow operation of the thread that executes the application on the producer core to designate a region of addresses associated with the cache for automatic demotion to shared cache.

Figure 4:
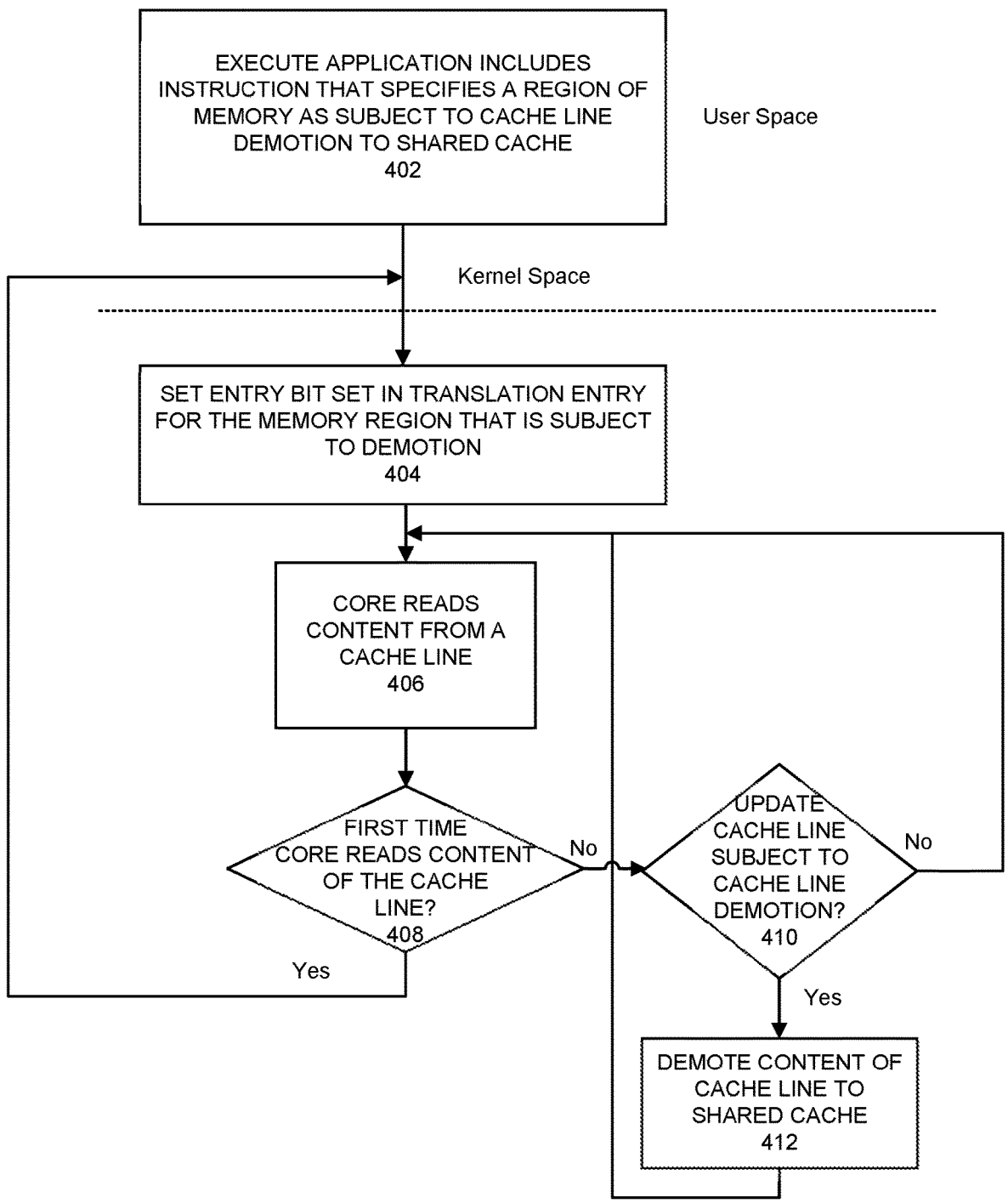
FIG. 4 depicts an example process.

FIG. 4 depicts a process to apply cache line demotion to a region of a cache associated with memory addresses subject to cache line demotion. The process can be used by cores or processors (e.g., fixed or programmable function devices or accelerators) that operate in a pipeline manner or otherwise share data using a shared cache. At 402, an application can be executed that includes a designation of a region of memory as subject to cache line demotion. For example, the application can include an instruction that designates a region of memory as subject to cache line demotion such that if a cache line, associated with the region of memory, is updated in a cache, content of any cache line in the cache is copied to a cache shared with another core or processor. In some examples, the cache line demotion instruction can cause data to be demoted to a memory device shared by multiple cores or processors instead of to a shared cache.

At 404, an entry bit can be set in a page table entry to indicate a region of memory addresses are subject to cache line demotion to shared memory. Kernel space can be used to maintain the page tables entries in some examples. At 406, a thread executed by a core can read content of a cache line for processing. At 408, a determination can made if the core read content of the cache line for the first time. If the core reads the content of the cache line for the first time, the process can return to 404. However, if the core is not reading the content of the cache line for the first time, the process can proceed to 410.

At 410, a determination can be made if content of a cache line is updated and the cache line is subject to cache line demotion. For example, the cache line can be subject to cache line demotion if a CLDEMOTE instruction is used or a cache line demotion for a memory region is applied. If the content of the cache line is updated, the process proceeds to 412. If the content of the cache line is not updated, the process proceeds to 406. At 412, content of the cache line that is updated can be copied to shared cache for access by another core or processor. In other examples, the content of the cache line can be copied to a memory device for access by another core or processor.

Figure 5:
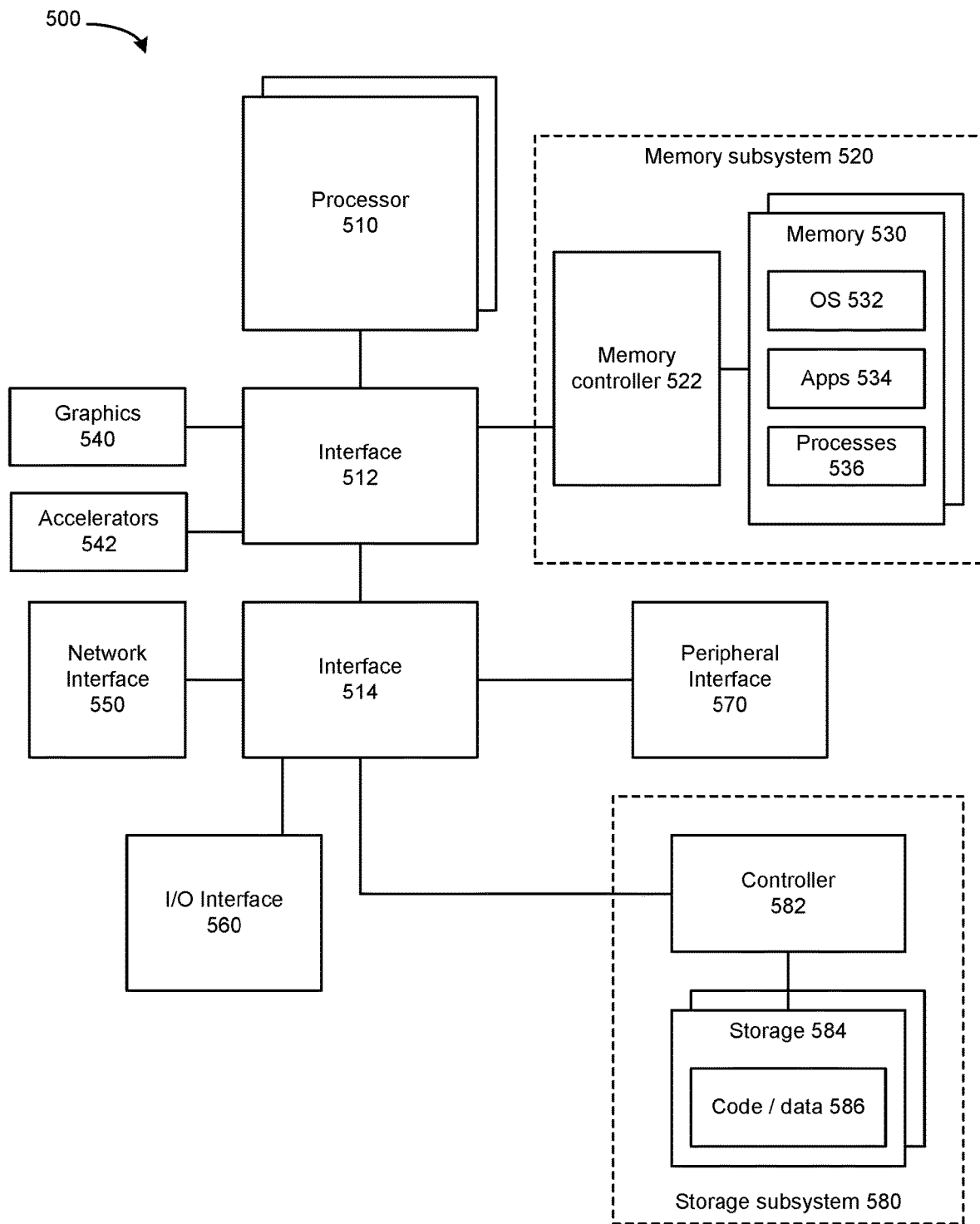
FIG. 5 depicts an example system.

FIG. 5 depicts an example system. The system can use embodiments described herein to automatically demote designated portions of a cache associated with a region of memory to shared cache. System 500 includes processor 510, which provides processing, operation management, and execution of instructions for system 500. Processor 510 can include any type of microprocessor, central processing unit (CPU), graphics processing unit (GPU), processing core, or other processing hardware to provide processing for system 500, or a combination of processors. Processor 510 controls the overall operation of system 500, and can be or include, one or more programmable general-purpose or special-purpose microprocessors, digital signal processors (DSPs), programmable controllers, application specific integrated circuits (ASICs), programmable logic devices (PLDs), or the like, or a combination of such devices.

In one example, system 500 includes interface 512 coupled to processor 510, which can represent a higher speed interface or a high throughput interface for system components that uses higher bandwidth connections, such as memory subsystem 520 or graphics interface components 540, or accelerators 542. Interface 512 represents an interface circuit, which can be a standalone component or integrated onto a processor die. Where present, graphics interface 540 interfaces to graphics components for providing a visual display to a user of system 500. In one example, graphics interface 540 can drive a high definition (HD) display that provides an output to a user. High definition can refer to a display having a pixel density of approximately 100 PPI (pixels per inch) or greater and can include formats such as full HD (e.g., 1080p), retina displays, 4K (ultra-high definition or UHD), or others. In one example, the display can include a touchscreen display. In one example, graphics interface 540 generates a display based on data stored in memory 530 or based on operations executed by processor 510 or both. In one example, graphics interface 540 generates a display based on data stored in memory 530 or based on operations executed by processor 510 or both.

Accelerators 542 can be fixed function and/or programmable offload engines that can be accessed or used by a processor 510. For example, an accelerator among accelerators 542 can provide compression (DC) capability, cryptography services such as public key encryption (PKE), cipher, hash/authentication capabilities, decryption, or other capabilities or services. In some embodiments, in addition or alternatively, an accelerator among accelerators 542 provides field select controller capabilities as described herein. In some cases, accelerators 542 can be integrated into a CPU socket (e.g., a connector to a motherboard or circuit board that includes a CPU and provides an electrical interface with the CPU). For example, accelerators 542 can include a single or multi-core processor, graphics processing unit, logical execution unit single or multi-level cache, functional units usable to independently execute programs or threads, application specific integrated circuits (ASICs), neural network processors (NNPs), programmable control logic, and programmable processing elements such as field programmable gate arrays (FPGAs).

Accelerators 542 can provide multiple neural networks, CPUs, processor cores, general purpose graphics processing units, or graphics processing units can be made available for use by artificial intelligence (AI) or machine learning (ML) models. For example, the AI model can use or include any or a combination of: a reinforcement learning scheme, Q-learning scheme, deep-Q learning, or Asynchronous Advantage Actor-Critic (A3C), combinatorial neural network, recurrent combinatorial neural network, or other AI or ML model. Multiple neural networks, processor cores, or graphics processing units can be made available for use by AI or ML models.

Memory subsystem 520 represents the main memory of system 500 and provides storage for code to be executed by processor 510, or data values to be used in executing a routine. Memory subsystem 520 can include one or more memory devices 530 such as read-only memory (ROM), flash memory, one or more varieties of random access memory (RAM) such as DRAM, or other memory devices, or a combination of such devices. Memory 530 stores and hosts, among other things, operating system (OS) 532 to provide a software platform for execution of instructions in system 500. Additionally, applications 534 can execute on the software platform of OS 532 from memory 530. Applications 534 represent programs that have their own operational logic to perform execution of one or more functions. Processes 536 represent agents or routines that provide auxiliary functions to OS 532 or one or more applications 534 or a combination. OS 532, applications 534, and processes 536 provide software logic to provide functions for system 500. In one example, memory subsystem 520 includes memory controller 522, which is a memory controller to generate and issue commands to memory 530. It can be understood that memory controller 522 could be a physical part of processor 510 or a physical part of interface 512. For example, memory controller 522 can be an integrated memory controller, integrated onto a circuit with processor 510.

While not specifically illustrated, it can be understood that system 500 can include one or more buses or bus systems between devices, such as a memory bus, a graphics bus, interface buses, or others. Buses or other signal lines can communicatively or electrically couple components together, or both communicatively and electrically couple the components. Buses can include physical communication lines, point-to-point connections, bridges, adapters, controllers, or other circuitry or a combination. Buses can include, for example, one or more of a system bus, a Peripheral Component Interconnect (PCI) bus, a Hyper Transport or industry standard architecture (ISA) bus, a small computer system interface (SCSI) bus, a universal serial bus (USB), or an Institute of Electrical and Electronics Engineers (IEEE) standard 1394 bus (Firewire).

In one example, system 500 includes interface 514, which can be coupled to interface 512. In one example, interface 514 represents an interface circuit, which can include standalone components and integrated circuitry. In one example, multiple user interface components or peripheral components, or both, couple to interface 514. Network interface 550 provides system 500 the ability to communicate with remote devices (e.g., servers or other computing devices) over one or more networks. Network interface 550 can include an Ethernet adapter, wireless interconnection components, cellular network interconnection components, USB (universal serial bus), or other wired or wireless standards-based or proprietary interfaces. Network interface 550 can transmit data to a device that is in the same data center or rack or a remote device, which can include sending data stored in memory. Network interface 550 can receive data from a remote device, which can include storing received data into memory. Various embodiments can be used in connection with network interface 550, processor 510, and memory subsystem 520.

In one example, system 500 includes one or more input/output (I/O) interface(s) 560. I/O interface 560 can include one or more interface components through which a user interacts with system 500 (e.g., audio, alphanumeric, tactile/touch, or other interfacing). Peripheral interface 570 can include any hardware interface not specifically mentioned above. Peripherals refer generally to devices that connect dependently to system 500. A dependent connection is one where system 500 provides the software platform or hardware platform or both on which operation executes, and with which a user interacts.

In one example, system 500 includes storage subsystem 580 to store data in a nonvolatile manner. In one example, in certain system implementations, at least certain components of storage 580 can overlap with components of memory subsystem 520. Storage subsystem 580 includes storage device(s) 584, which can be or include any conventional medium for storing large amounts of data in a non-volatile manner, such as one or more magnetic, solid state, or optical based disks, or a combination. Storage 584 holds code or instructions and data 586 in a persistent state (e.g., the value is retained despite interruption of power to system 500). Storage 584 can be generically considered to be a "memory," although memory 530 is typically the executing or operating memory to provide instructions to processor 510. Whereas storage 584 is nonvolatile, memory 530 can include volatile memory (e.g., the value or state of the data is indeterminate if power is interrupted to system 500). In one example, storage subsystem 580 includes controller 582 to interface with storage 584. In one example controller 582 is a physical part of interface 514 or processor 510 or can include circuits or logic in both processor 510 and interface 514.

A volatile memory is memory whose state (and therefore the data stored in it) is indeterminate if power is interrupted to the device. Dynamic volatile memory requires refreshing the data stored in the device to maintain state. One example of dynamic volatile memory incudes DRAM (Dynamic Random Access Memory), or some variant such as Synchronous DRAM (SDRAM). Another example of volatile memory includes cache or static random access memory (SRAM). A memory subsystem as described herein may be compatible with a number of memory technologies, such as DDR3 (Double Data Rate version 3, original release by JEDEC (Joint Electronic Device Engineering Council) on Jun. 27, 2007). DDR4 (DDR version 4, initial specification published in September 2012 by JEDEC), DDR4E (DDR version 4), LPDDR3 (Low Power DDR version 3, JESD209-3B, August 2013 by JEDEC), LPDDR4) LPDDR version 4, JESD209-4, originally published by JEDEC in August 2014), WIO2 (Wide Input/output version 2, JESD229-2 originally published by JEDEC in August 2014, HBM (High Bandwidth Memory, JESD325, originally published by JEDEC in October 2013, LPDDR5 (currently in discussion by JEDEC), HBM2 (HBM version 2), currently in discussion by JEDEC, or others or combinations of memory technologies, and technologies based on derivatives or extensions of such specifications.

A non-volatile memory (NVM) device is a memory whose state is determinate even if power is interrupted to the device. In one embodiment, the NVM device can comprise a block addressable memory device, such as NAND technologies, or more specifically, multi-threshold level NAND flash memory (for example, Single-Level Cell ("SLC"), Multi-Level Cell ("MLC"), Quad-Level Cell ("QLC"), Tri-Level Cell ("TLC"), or some other NAND). A NVM device can also comprise a byte-addressable write-in-place three dimensional cross point memory device, or other byte addressable write-in-place NVM device (also referred to as persistent memory), such as single or multi-level Phase Change Memory (PCM) or phase change memory with a switch (PCMS), NVM devices that use chalcogenide phase change material (for example, chalcogenide glass), resistive memory including metal oxide base, oxygen vacancy base and Conductive Bridge Random Access Memory (CB-RAM), nanowire memory, ferroelectric random access memory (FeRAM, FRAM), magneto resistive random access memory (MRAM) that incorporates memristor technology, spin transfer torque (STT)-MRAM, a spintronic magnetic junction memory based device, a magnetic tunneling junction (MTJ) based device, a DW (Domain Wall) and SOT (Spin Orbit Transfer) based device, a thyristor based memory device, or a combination of any of the above, or other memory.

A power source (not depicted) provides power to the components of system 500. More specifically, power source typically interfaces to one or multiple power supplies in system 500 to provide power to the components of system 500. In one example, the power supply includes an AC to DC (alternating current to direct current) adapter to plug into a wall outlet. Such AC power can be renewable energy (e.g., solar power) power source. In one example, power source includes a DC power source, such as an external AC to DC converter. In one example, power source or power supply includes wireless charging hardware to charge via proximity to a charging field. In one example, power source can include an internal battery, alternating current supply, motion-based power supply, solar power supply, or fuel cell source.

In an example, system 500 can be implemented using interconnected compute sleds of processors, memories, storages, network interfaces, and other components. High speed interconnects can be used such as: Ethernet (IEEE 802.3), remote direct memory access (RDMA), InfiniBand, Internet Wide Area RDMA Protocol (iWARP), Transmission Control Protocol (TCP), User Datagram Protocol (UDP), quick UDP Internet Connections (QUIC), RDMA over Converged Ethernet (RoCE), Peripheral Component Interconnect express (PCIe), Intel QuickPath Interconnect (QPI), Intel Ultra Path Interconnect (UPI), Intel On-Chip System Fabric (IOSF), Omnipath, Compute Express Link (CXL), HyperTransport, high-speed fabric, NVLink, Advanced Microcontroller Bus Architecture (AMBA) interconnect, OpenCAPI, Gen-Z, Cache Coherent Interconnect for Accelerators (CCIX), Infinity Fabric (IF), 3GPP Long Term Evolution (LTE) (4G), 3GPP 5G, and variations thereof. Data can be copied or stored to virtualized storage nodes using a protocol such as NVMe over Fabrics (NVMe-oF) or NVMe.

Embodiments herein may be implemented in various types of computing and networking equipment, such as switches, routers, racks, and blade servers such as those employed in a data center and/or server farm environment. The servers used in data centers and server farms comprise arrayed server configurations such as rack-based servers or blade servers. These servers are interconnected in communication via various network provisions, such as partitioning sets of servers into Local Area Networks (LANs) with appropriate switching and routing facilities between the LANs to form a private Intranet. For example, cloud hosting facilities may typically employ large data centers with a multitude of servers. A blade comprises a separate computing platform that is configured to perform server-type functions, that is, a "server on a card." Accordingly, each blade includes components common to conventional servers, including a main printed circuit board (main board) providing internal wiring (e.g., buses) for coupling appropriate integrated circuits (ICs) and other components mounted to the board.

Figure 6:
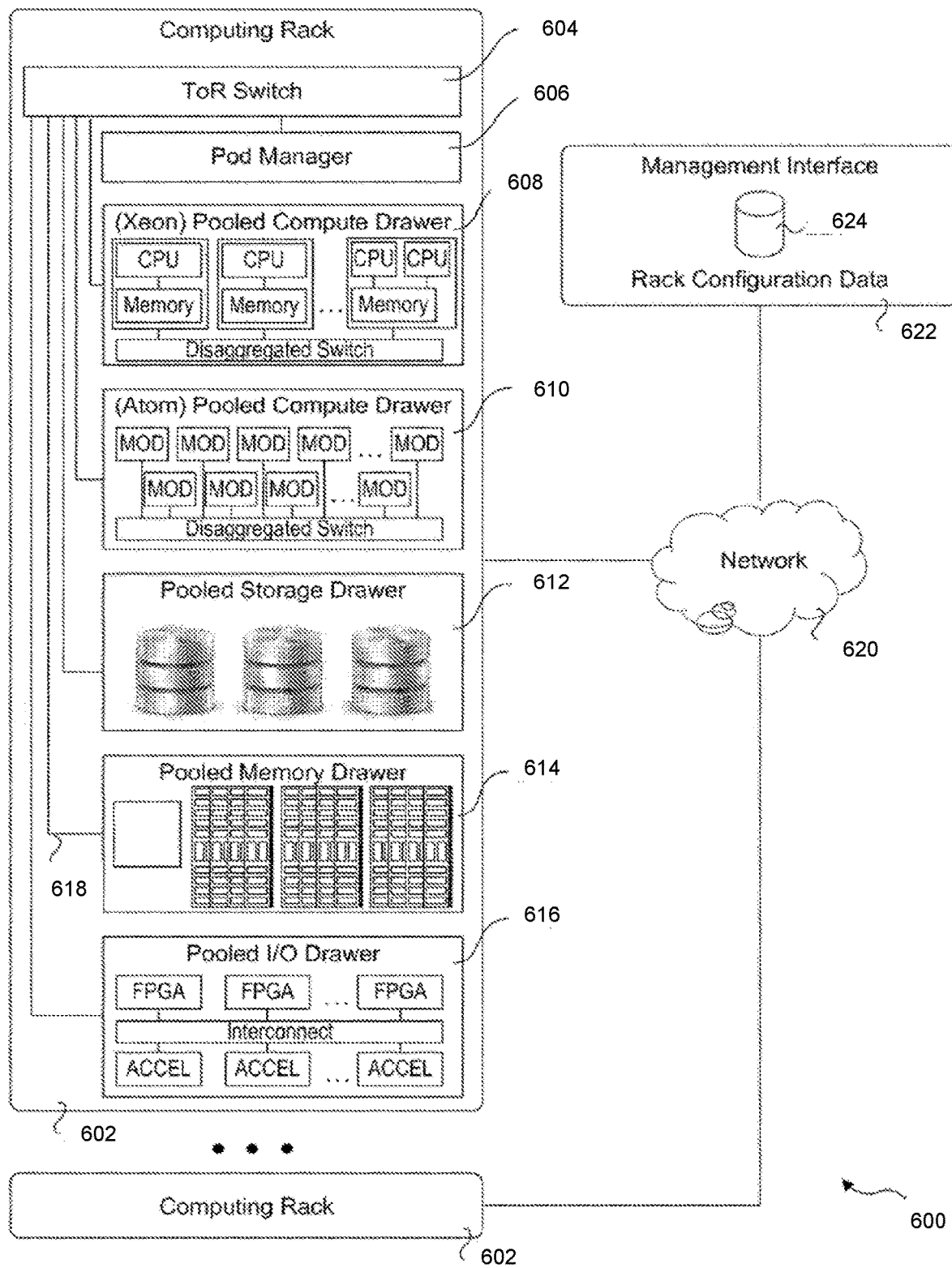
FIG. 6 depicts an environment.

FIG. 6 depicts an environment 600 includes multiple computing racks 602, one or more including a Top of Rack (ToR) switch 604, a pod manager 606, and a plurality of pooled system drawers. Various embodiments can be used among racks to share content or data or results of processing or storing content by automatic demotion of content in a cache. Generally, the pooled system drawers may include pooled compute drawers and pooled storage drawers. Optionally, the pooled system drawers may also include pooled memory drawers and pooled Input/Output (I/O) drawers. In the illustrated embodiment the pooled system drawers include an Intel® XEON® pooled computer drawer 608, and Intel® ATOM™ pooled compute drawer 610, a pooled storage drawer 612, a pooled memory drawer 614, and a pooled I/O drawer 616. Any of the pooled system drawers is connected to ToR switch 604 via a high-speed link 618, such as a 40 Gigabit/second (Gb/s) or 100 Gb/s Ethernet link or a 100+Gb/s Silicon Photonics (SiPh) optical link, or higher speeds.

Multiple of the computing racks 602 may be interconnected via their ToR switches 604 (e.g., to a pod-level switch or data center switch), as illustrated by connections to a network 620. In some embodiments, groups of computing racks 602 are managed as separate pods via pod manager(s) 606. In one embodiment, a single pod manager is used to manage all of the racks in the pod. Alternatively, distributed pod managers may be used for pod management operations.

Environment 600 further includes a management interface 622 that is used to manage various aspects of the environment. This includes managing rack configuration, with corresponding parameters stored as rack configuration data 624.

In some examples, embodiments described herein can be used in connection with a base station (e.g., 3G, 4G, 5G and so forth), macro base station (e.g., 5G networks), picostation (e.g., an IEEE 802.11 compatible access point), nanostation (e.g., for Point-to-MultiPoint (PtMP) applications), on-premises data centers, off-premises data centers, edge network elements, fog network elements, and/or hybrid data centers (e.g., data center that use virtualization, cloud and software-defined networking to deliver application workloads across physical data centers and distributed multi-cloud environments).

For example, various embodiments can be used for wired or wireless protocols (e.g., 3GPP Long Term Evolution (LTE) (4G) or 3GPP 5G), on-premises data centers, off-premises data centers, base station devices, sensor data sender or receiver devices (e.g., for autonomous vehicles or augmented reality applications), endpoint devices, servers, routers, edge network elements (computing elements provided physically closer to a base station or network access point than a data center), fog network elements (computing elements provided physically closer to a base station or network access point than a data center but further from an edge network), and/or hybrid data centers (e.g., data center that use virtualization, cloud and software-defined networking to deliver application workloads across physical data centers and distributed multi-cloud environments). Network or computing elements can be used in local area network (LAN), metropolitan area network (MAN), network with devices connected using optical fiber links, campus area network (CAN), or wide area network (WAN).

Exemplary Instruction Format

Figure 7:
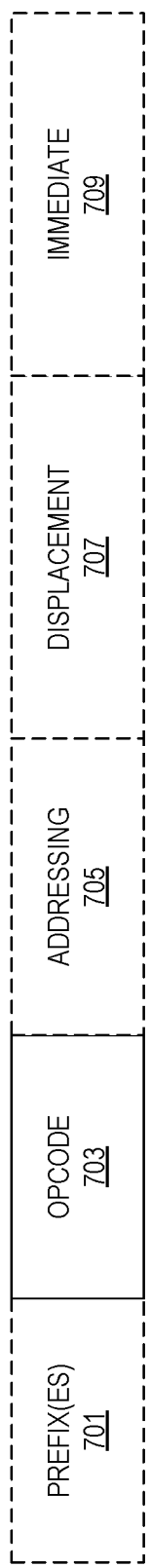
FIG. 7 illustrates embodiments of an instruction format.

FIG. 7 illustrates embodiments of an instruction format. As illustrated, an instruction may include multiple components including, but not limited to, one or more fields for: one or more prefixes 701, an opcode 703, addressing information 705 (e.g., register identifiers, memory addressing information, etc.), a displacement value 707, and/or an immediate 709. Note that some instructions utilize some or all of the fields of the format whereas others may only use the field for the opcode 703. In some embodiments, the order illustrated is the order in which these fields are to be encoded, however, it should be appreciated that in other embodiments these fields may be encoded in a different order, combined, etc.

The prefix(es) field(s) 701, when used, modifies an instruction. In some embodiments, one or more prefixes are used to repeat string instructions (e.g., 0xF0, 0xF2, 0xF3, etc.), to provide section overrides (e.g., 0x2E, 0x36, 0x3E, 0x26, 0x64, 0x65, 0x2E, 0x3E, etc.), to perform bus lock operations, and/or to change operand (e.g., 0x66) and address sizes (e.g., 0x67). Certain instructions require a mandatory prefix (e.g., 0x66, 0xF2, 0xF3, etc.). Certain of these prefixes may be considered "legacy" prefixes. Other prefixes, one or more examples of which are detailed herein, indicate, and/or provide further capability, such as specifying particular registers, etc. The other prefixes typically follow the "legacy" prefixes.

The opcode field 703 is used to at least partially define the operation to be performed upon a decoding of the instruction. In some embodiments, a primary opcode encoded in the opcode field 703 is 1, 2, or 3 bytes in length. In other embodiments, a primary opcode can be a different length. An additional 3-bit opcode field is sometimes encoded in another field.

The addressing field 705 is used to address one or more operands of the instruction, such as a location in memory or one or more registers.

Figure 8:
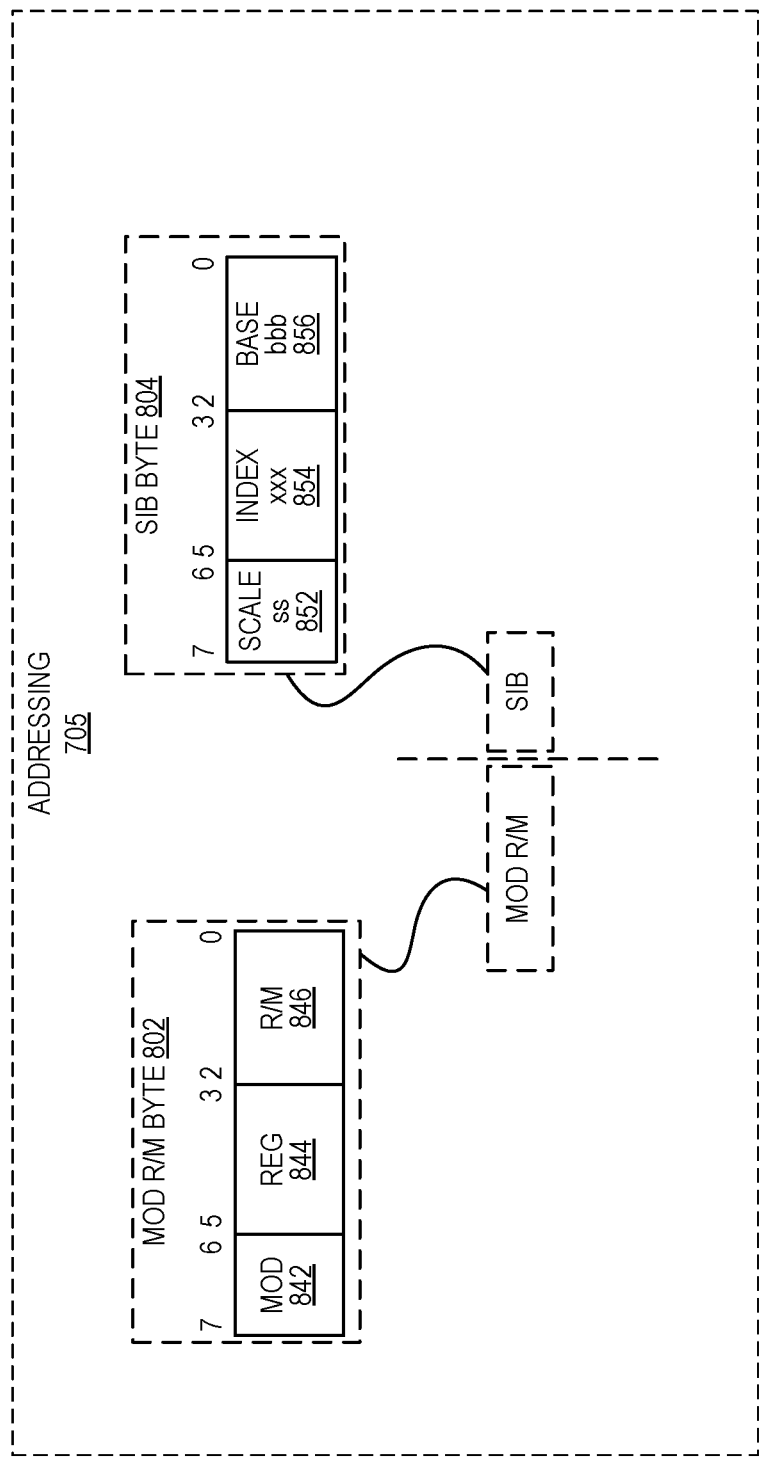
FIG. 8 illustrates embodiments of an addressing field.

FIG. 8 illustrates embodiments of the addressing field 705. In this illustration, an optional ModR/M byte 802 and an optional Scale, Index, Base (SIB) byte 804 are shown. The ModR/M byte 802 and the SIB byte 804 are used to encode up to two operands of an instruction, each of which is a direct register or effective memory address. Note that each of these fields are optional in that not all instructions include one or more of these fields. The MOD R/M byte 802 includes a MOD field 842, a register field 844, and R/M field 846.

The content of the MOD field 842 distinguishes between memory access and non-memory access modes. In some embodiments, when the MOD field 842 has a value of b11, a register-direct addressing mode is utilized, and otherwise register-indirect addressing is used.

The register field 844 may encode either the destination register operand or a source register operand, or may encode an opcode extension and not be used to encode any instruction operand. The content of register index field 844, directly or through address generation, specifies the locations of a source or destination operand (either in a register or in memory). In some embodiments, the register field 844 is supplemented with an additional bit from a prefix (e.g., prefix 701) to allow for greater addressing.

The R/M field 846 may be used to encode an instruction operand that references a memory address, or may be used to encode either the destination register operand or a source register operand. Note the R/M field 846 may be combined with the MOD field 842 to dictate an addressing mode in some embodiments.

The SIB byte 804 includes a scale field 852, an index field 854, and a base field 856 to be used in the generation of an address. The scale field 852 indicates scaling factor. The index field 854 specifies an index register to use. In some embodiments, the index field 854 is supplemented with an additional bit from a prefix (e.g., prefix 701) to allow for greater addressing. The base field 856 specifies a base register to use. In some embodiments, the base field 856 is supplemented with an additional bit from a prefix (e.g., prefix 701) to allow for greater addressing. In practice, the content of the scale field 852 allows for the scaling of the content of the index field 854 for memory address generation (e.g., for address generation that uses 2$^{scale}$*index+base).

Some addressing forms utilize a displacement value to generate a memory address. For example, a memory address may be generated according to 2$^{scale}$*index+base+displacement, index*scale+displacement, r/m+displacement, instruction pointer (RIP/EIP)+displacement, register+displacement, etc. The displacement may be a 1-byte, 2-byte, 4-byte, etc. value. In some embodiments, a displacement field 707 provides this value. Additionally, in some embodiments, a displacement factor usage is encoded in the MOD field of the addressing field 705 that indicates a compressed displacement scheme for which a displacement value is calculated by multiplying disp8 in conjunction with a scaling factor N that is determined based on the vector length, the value of a b bit, and the input element size of the instruction. The displacement value is stored in the displacement field 707.

In some embodiments, an immediate field 709 specifies an immediate for the instruction. An immediate may be encoded as a 1-byte value, a 2-byte value, a 4-byte value, etc.

Various embodiments of the ENB_CLDEMOTE instruction include one or more of the fields detailed above. For example, ENB_CLDEMOTE can be represented by a mnemonic of the opcode encoded in opcode field 703. The ENB_CLDEMOTE instruction may also include a prefix 701 to further modify the instruction (e.g., dictate operand sizes, etc.).

The address (e.g., discussed as [addr] above) is provided by addressing field(s) 705. The address may be stored in a register (such as a register identified by REG 844), provided using one or more of SIB addressing (e.g., using SIB byte 804), the R/M field 846, the displacement field 707, etc.

Manners of providing depth may also vary by embodiment. For example, the depth may be stored in a register (e.g., as indicated by REG 844 or R/M 846) or directly encoded using the immediate field 709.

The table below provides examples of where the address and depth are located or referenced.

| Opcode | Address | Depth |
| --- | --- | --- |
| ENB_CLDEMOTE | Memory address | Register |
| ENB_CLDEMOTE | Memory address | Immediate field |
| ENB_CLDEMOTE | Register | Register |
| ENB_CLDEMOTE | Register | Immediate field |

Exemplary Register Architecture

FIG. 9 is a block diagram of a register architecture 900 according to some embodiments. In the embodiment illustrated, there are 32 vector registers 910 that are 512 bits wide; these registers are referenced as zmm0 through zmm31. The lower order 256 bits of the lower 16 zmm registers are overlaid on registers ymm0-15. The lower order 128 bits of the lower 16 zmm registers (the lower order 128 bits of the ymm registers) are overlaid on registers xmm0-15.

Write mask registers 915—in the embodiment illustrated, there are 8 write mask registers (k0 through k7), each 64 bits in size. In an alternate embodiment, the write mask registers 915 are 16 bits in size. As previously described, in some embodiments, the vector mask register k0 cannot be used as a write mask; when the encoding that would normally indicate k0 is used for a write mask, it selects a hardwired write mask of 0xffff, effectively disabling write masking for that instruction.

General-purpose registers 925—in the embodiment illustrated, there are sixteen 64-bit general-purpose registers that are used along with the existing x86 addressing modes to address memory operands. These registers are referenced by the names RAX, RBX, RCX, RDX, RBP, RSI, RDI, RSP, and R8 through R15.

Scalar floating-point stack register file (x87 stack) 945, on which is aliased the MMX packed integer flat register file 950—in the embodiment illustrated, the x87 stack is an eight-element stack used to perform scalar floating-point operations on 32/64/80-bit floating-point data using the x87 instruction set extension; while the MMX registers are used to perform operations on 64-bit packed integer data, as well as to hold operands for some operations performed between the MMX and XMM registers.

Alternative embodiments may use wider or narrower registers. Additionally, alternative embodiments may use more, less, or different register files and registers.

Exemplary Core Architectures, Processors, and Computer Architectures

Processor cores may be implemented in different ways, for different purposes, and in different processors. For instance, implementations of such cores may include: 1) a general purpose in-order core intended for general-purpose computing; 2) a high performance general purpose out-of-order core intended for general-purpose computing; 3) a special purpose core intended primarily for graphics and/or scientific (throughput) computing. Implementations of different processors may include: 1) a CPU including one or more general purpose in-order cores intended for general-purpose computing and/or one or more general purpose out-of-order cores intended for general-purpose computing; and 2) a coprocessor including one or more special purpose cores intended primarily for graphics and/or scientific (throughput). Such different processors lead to different computer system architectures, which may include: 1) the coprocessor on a separate chip from the CPU; 2) the coprocessor on a separate die in the same package as a CPU; 3) the coprocessor on the same die as a CPU (in which case, such a coprocessor is sometimes referred to as special purpose logic, such as integrated graphics and/or scientific (throughput) logic, or as special purpose cores); and 4) a system on a chip that may include on the same die the described CPU (sometimes referred to as the application core(s) or application processor(s)), the above described coprocessor, and additional functionality. Exemplary core architectures are described next, followed by descriptions of exemplary processors and computer architectures.

Exemplary Core Architectures

In-Order and Out-of-Order Core Block Diagram

FIG. 10A is a block diagram illustrating both an exemplary in-order pipeline and an exemplary register renaming, out-of-order issue/execution pipeline according to some embodiments of the invention. FIG. 10B is a block diagram illustrating both an exemplary embodiment of an in-order architecture core and an exemplary register renaming, out-of-order issue/execution architecture core to be included in a processor according to some embodiments of the invention. The solid lined boxes in FIGS. 10A-B illustrate the in-order pipeline and in-order core, while the optional addition of the dashed lined boxes illustrates the register renaming, out-of-order issue/execution pipeline and core. Given that the in-order aspect is a subset of the out-of-order aspect, the out-of-order aspect will be described.

In FIG. 10A, a processor pipeline 1000 includes a fetch stage 1002, a length decode stage 1004, a decode stage 1006, an allocation stage 1008, a renaming stage 1010, a scheduling (also known as a dispatch or issue) stage 1012, a register read/memory read stage 1014, an execute stage 1016, a write back/memory write stage 1018, an exception handling stage 1022, and a commit stage 1024.

FIG. 10B shows processor core 1090 including a front end unit 1030 coupled to an execution engine unit 1050, and both are coupled to a memory unit 1070. The core 1090 may be a reduced instruction set computing (RISC) core, a complex instruction set computing (CISC) core, a very long instruction word (VLIW) core, or a hybrid or alternative core type. As yet another option, the core 1090 may be a special-purpose core, such as, for example, a network or communication core, compression engine, coprocessor core, general purpose computing graphics processing unit (GPGPU) core, graphics core, or the like.

The front end unit 1030 includes a branch prediction unit 1032 coupled to an instruction cache unit 1034, which is coupled to an instruction translation lookaside buffer (TLB) 1036, which is coupled to an instruction fetch unit 1038, which is coupled to a decode unit 1040. The decode unit 1040 (or decoder) may decode instructions, and generate as an output one or more micro-operations, micro-code entry points, microinstructions, other instructions, or other control signals, which are decoded from, or which otherwise reflect, or are derived from, the original instructions. The decode unit 1040 may be implemented using various different mechanisms. Examples of suitable mechanisms include, but are not limited to, look-up tables, hardware implementations, programmable logic arrays (PLAs), microcode read only memories (ROMs), etc. In one embodiment, the core 1090 includes a microcode ROM or other medium that stores microcode for certain macroinstructions (e.g., in decode unit 1040 or otherwise within the front end unit 1030). The decode unit 1040 is coupled to a rename/allocator unit 1052 in the execution engine unit 1050.

The execution engine unit 1050 includes the rename/allocator unit 1052 coupled to a retirement unit 1054 and a set of one or more scheduler unit(s) 1056. The scheduler unit(s) 1056 represents any number of different schedulers, including reservations stations, central instruction window, etc. The scheduler unit(s) 1056 is coupled to the physical register file(s) unit(s) 1058. Each of the physical register file(s) units 1058 represents one or more physical register files, different ones of which store one or more different data types, such as scalar integer, scalar floating-point, packed integer, packed floating-point, vector integer, vector floating-point, status (e.g., an instruction pointer that is the address of the next instruction to be executed), etc. In one embodiment, the physical register file(s) unit 1058 comprises a vector registers unit, a write mask registers unit, and a scalar registers unit. These register units may provide architectural vector registers, vector mask registers, and general purpose registers. The physical register file(s) unit(s) 1058 is overlapped by the retirement unit 1054 to illustrate various ways in which register renaming and out-of-order execution may be implemented (e.g., using a reorder buffer(s) and a retirement register file(s); using a future file(s), a history buffer(s), and a retirement register file(s); using a register maps and a pool of registers; etc.). The retirement unit 1054 and the physical register file(s) unit(s) 1058 are coupled to the execution cluster(s) 1060. The execution cluster(s) 1060 includes a set of one or more execution units 1062 and a set of one or more memory access units 1064. The execution units 1062 may perform various operations (e.g., shifts, addition, subtraction, multiplication) and on various types of data (e.g., scalar floating-point, packed integer, packed floating-point, vector integer, vector floating-point). While some embodiments may include a number of execution units dedicated to specific functions or sets of functions, other embodiments may include only one execution unit or multiple execution units that all perform all functions. The scheduler unit(s) 1056, physical register file(s) unit(s) 1058, and execution cluster(s) 1060 are shown as being possibly plural because certain embodiments create separate pipelines for certain types of data/operations (e.g., a scalar integer pipeline, a scalar floating-point/packed integer/packed floating-point/vector integer/vector floating-point pipeline, and/or a memory access pipeline that each have their own scheduler unit, physical register file(s) unit, and/or execution cluster—and in the case of a separate memory access pipeline, certain embodiments are implemented in which only the execution cluster of this pipeline has the memory access unit(s) 1064). It should also be understood that where separate pipelines are used, one or more of these pipelines may be out-of-order issue/execution and the rest in-order.

The set of memory access units 1064 is coupled to the memory unit 1070, which includes a data TLB unit 1072 coupled to a data cache unit 1074 coupled to a level 2 (L2) cache unit 1076. In one exemplary embodiment, the memory access units 1064 may include a load unit, a store address unit, and a store data unit, each of which is coupled to the data TLB unit 1072 in the memory unit 1070. The instruction cache unit 1034 is further coupled to a level 2 (L2) cache unit 1076 in the memory unit 1070. The L2 cache unit 1076 is coupled to one or more other levels of cache and eventually to a main memory.

By way of example, the exemplary register renaming, out-of-order issue/execution core architecture may implement the pipeline 1000 as follows: 1) the instruction fetch 1038 performs the fetch and length decoding stages 1002 and 1004; 2) the decode unit 1040 performs the decode stage 1006; 3) the rename/allocator unit 1052 performs the allocation stage 1008 and renaming stage 1010; 4) the scheduler unit(s) 1056 performs the schedule stage 1012; 5) the physical register file(s) unit(s) 1058 and the memory unit 1070 perform the register read/memory read stage 1014; the execution cluster 1060 perform the execute stage 1016; 6) the memory unit 1070 and the physical register file(s) unit(s) 1058 perform the write back/memory write stage 1018; 7) various units may be involved in the exception handling stage 1022; and 8) the retirement unit 1054 and the physical register file(s) unit(s) 1058 perform the commit stage 1024.

The core 1090 may support one or more instructions sets (e.g., the x86 instruction set (with some extensions that have been added with newer versions); the MIPS instruction set of MIPS Technologies of Sunnyvale, CA; the ARM instruction set (with optional additional extensions such as NEON) of ARM Holdings of Sunnyvale, CA), including the instruction(s) described herein. In one embodiment, the core 1090 includes logic to support a packed data instruction set extension (e.g., AVX1, AVX2), thereby allowing the operations used by many multimedia applications to be performed using packed data.

It should be understood that the core may support multithreading (executing two or more parallel sets of operations or threads), and may do so in a variety of ways including time sliced multithreading, simultaneous multithreading (where a single physical core provides a logical core for each of the threads that physical core is simultaneously multithreading), or a combination thereof (e.g., time sliced fetching and decoding and simultaneous multithreading thereafter such as in the Intel® Hyperthreading technology).

While register renaming is described in the context of out-of-order execution, it should be understood that register renaming may be used in an in-order architecture. While the illustrated embodiment of the processor also includes separate instruction and data cache units 1034/1074 and a shared L2 cache unit 1076, alternative embodiments may have a single internal cache for both instructions and data, such as, for example, a Level 1 (L1) internal cache, or multiple levels of internal cache. In some embodiments, the system may include a combination of an internal cache and an external cache that is external to the core and/or the processor. Alternatively, all of the cache may be external to the core and/or the processor.

Specific Exemplary In-Order Core Architecture

Figure 11B:
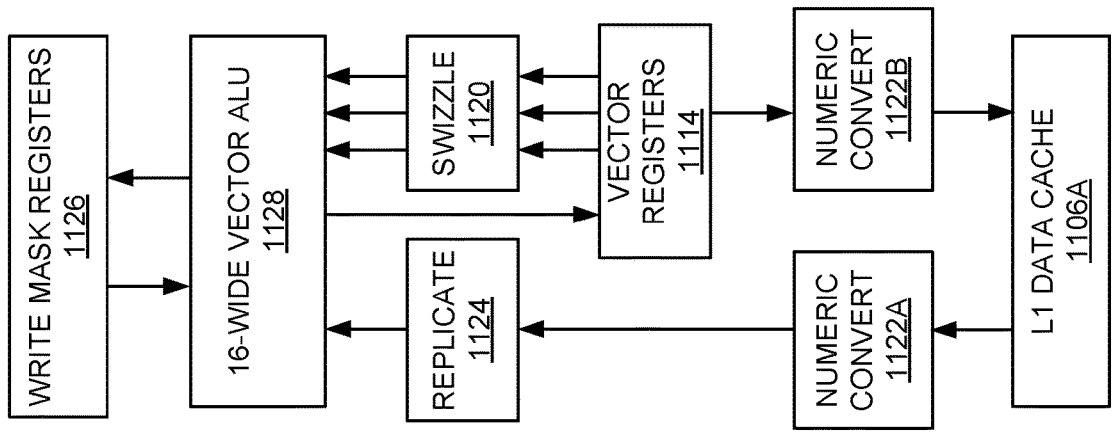
FIGS. 11A-B illustrate a block diagram of a more specific exemplary in-order core architecture, which core would be one of several logic blocks (including other cores of the same type and/or different types) in a chip.
Figure 11A:
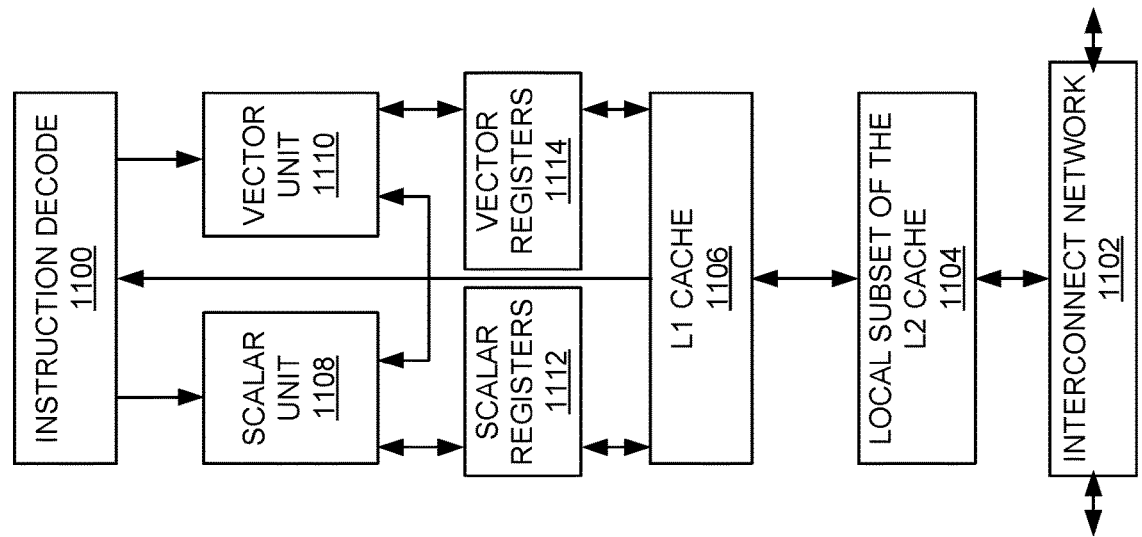

FIGS. 11A-B illustrate a block diagram of a more specific exemplary in-order core architecture, which core would be one of several logic blocks (including other cores of the same type and/or different types) in a chip. The logic blocks communicate through a high-bandwidth interconnect network (e.g., a ring network) with some fixed function logic, memory I/O interfaces, and other necessary I/O logic, depending on the application.

FIG. 11A is a block diagram of a single processor core, along with its connection to the on-die interconnect network 1102 and with its local subset of the Level 2 (L2) cache 1104, according to some embodiments of the invention. In one embodiment, an instruction decoder 1100 supports the x86 instruction set with a packed data instruction set extension. An L1 cache 1106 allows low-latency accesses to cache memory into the scalar and vector units. While in one embodiment (to simplify the design), a scalar unit 1108 and a vector unit 1110 use separate register sets (respectively, scalar registers 1112 and vector registers 1114) and data transferred between them is written to memory and then read back in from a level 1 (L1) cache 1106, alternative embodiments of the invention may use a different approach (e.g., use a single register set or include a communication path that allow data to be transferred between the two register files without being written and read back).

The local subset of the L2 cache 1104 is part of a global L2 cache that is divided into separate local subsets, one per processor core. Each processor core has a direct access path to its own local subset of the L2 cache 1104. Data read by a processor core is stored in its L2 cache subset 1104 and can be accessed quickly, in parallel with other processor cores accessing their own local L2 cache subsets. Data written by a processor core is stored in its own L2 cache subset 1104 and is flushed from other subsets, if necessary. The ring network ensures coherency for shared data. The ring network is bi-directional to allow agents such as processor cores, L2 caches and other logic blocks to communicate with each other within the chip. Each ring data-path is 1012-bits wide per direction.

FIG. 11B is an expanded view of part of the processor core in FIG. 11A according to some embodiments of the invention. FIG. 11B includes an L1 data cache 1106A part of the L1 cache 1106, as well as more detail regarding the vector unit 1110 and the vector registers 1114. Specifically, the vector unit 1110 is a 16-wide vector processing unit (VPU) (see the 16-wide ALU 1128), which executes one or more of integer, single-precision float, and double-precision float instructions. The VPU supports swizzling the register inputs with swizzle unit 1120, numeric conversion with numeric convert units 1122A and 1122B, and replication with replication unit 1124 on the memory input. Write mask registers 1126 allow predicating resulting vector writes.

Figure 12:
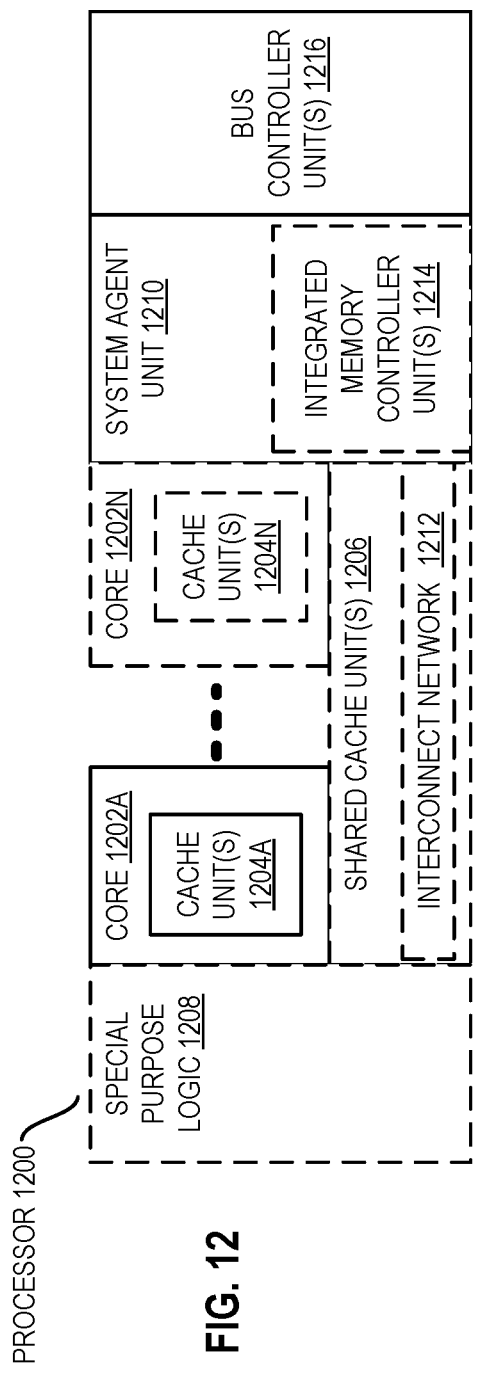
FIG. 12 is a block diagram of a processor that may have more than one core, may have an integrated memory controller, and may have integrated graphics according to some embodiments.

FIG. 12 is a block diagram of a processor 1200 that may have more than one core, may have an integrated memory controller, and may have integrated graphics according to some embodiments of the invention. The solid lined boxes in FIG. 12 illustrate a processor 1200 with a single core 1202A, a system agent 1210, a set of one or more bus controller units 1216, while the optional addition of the dashed lined boxes illustrates an alternative processor 1200 with multiple cores 1202A through 1202N, a set of one or more integrated memory controller unit(s) 1214 in the system agent unit 1210, and special purpose logic 1208.

Thus, different implementations of the processor 1200 may include: 1) a CPU with the special purpose logic 1208 being integrated graphics and/or scientific (throughput) logic (which may include one or more cores), and the cores 1202A-N being one or more general purpose cores (e.g., general purpose in-order cores, general purpose out-of-order cores, a combination of the two); 2) a coprocessor with the cores 1202A-N being a large number of special purpose cores intended primarily for graphics and/or scientific (throughput); and 3) a coprocessor with the cores 1202A-N being a large number of general purpose in-order cores. Thus, the processor 1200 may be a general-purpose processor, coprocessor or special-purpose processor, such as, for example, a network or communication processor, compression engine, graphics processor, GPGPU (general purpose graphics processing unit), a high-throughput many integrated core (MIC) coprocessor (including 30 or more cores), embedded processor, or the like. The processor may be implemented on one or more chips. The processor 1200 may be a part of and/or may be implemented on one or more substrates using any of a number of process technologies, such as, for example, BiCMOS, CMOS, or NMOS.

The memory hierarchy includes one or more levels of cache within the cores, a set of one or more shared cache units 1206, and external memory (not shown) coupled to the set of integrated memory controller units 1214. The set of shared cache units 1206 may include one or more mid-level caches, such as level 2 (L2), level 3 (L3), level 4 (L4), or other levels of cache, a last level cache (LLC), and/or combinations thereof. While in one embodiment a ring based interconnect unit 1212 interconnects the integrated graphics logic 1208 (integrated graphics logic 1208 is an example of and is also referred to herein as special purpose logic), the set of shared cache units 1206, and the system agent unit 1210/integrated memory controller unit(s) 1214, alternative embodiments may use any number of well-known techniques for interconnecting such units. In one embodiment, coherency is maintained between one or more cache units 1206 and cores 1202-A-N.

In some embodiments, one or more of the cores 1202A-N are capable of multithreading. The system agent 1210 includes those components coordinating and operating cores 1202A-N. The system agent unit 1210 may include for example a power control unit (PCU) and a display unit. The PCU may be or include logic and components needed for regulating the power state of the cores 1202A-N and the integrated graphics logic 1208. The display unit is for driving one or more externally connected displays.

The cores 1202A-N may be homogenous or heterogeneous in terms of architecture instruction set; that is, two or more of the cores 1202A-N may be capable of execution the same instruction set, while others may be capable of executing only a subset of that instruction set or a different instruction set.

Exemplary Computer Architectures

FIGS. 13-16 are block diagrams of exemplary computer architectures. Other system designs and configurations known in the arts for laptops, desktops, handheld PCs, personal digital assistants, engineering workstations, servers, network devices, network hubs, switches, embedded processors, digital signal processors (DSPs), graphics devices, video game devices, set-top boxes, micro controllers, cell phones, portable media players, hand held devices, and various other electronic devices, are also suitable. In general, a huge variety of systems or electronic devices capable of incorporating a processor and/or other execution logic as disclosed herein are generally suitable.

Figure 13:
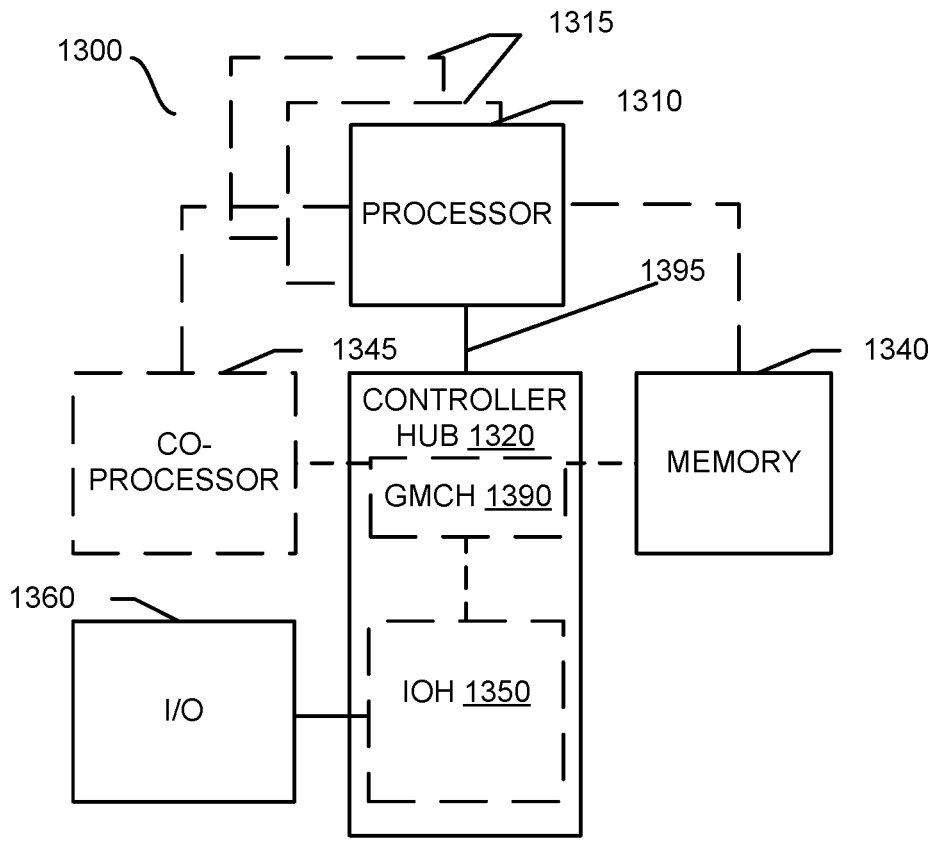
FIGS. 13-16 are block diagrams of exemplary computer architectures.

Referring now to FIG. 13, shown is a block diagram of a system 1300 in accordance with one embodiment of the present invention. The system 1300 may include one or more processors 1310, 1315, which are coupled to a controller hub 1320. In one embodiment the controller hub 1320 includes a graphics memory controller hub (GMCH) 1390 and an Input/Output Hub (IOH) 1350 (which may be on separate chips); the GMCH 1390 includes memory and graphics controllers to which are coupled memory 1340 and a coprocessor 1345; the IOH 1350 couples input/output (I/O) devices 1360 to the GMCH 1390. Alternatively, one or both of the memory and graphics controllers are integrated within the processor (as described herein), the memory 1340 and the coprocessor 1345 are coupled directly to the processor 1310, and the controller hub 1320 in a single chip with the IOH 1350.

The optional nature of additional processors 1315 is denoted in FIG. 13 with broken lines. Each processor 1310, 1315 may include one or more of the processing cores described herein and may be some version of the processor 1200.

The memory 1340 may be, for example, dynamic random access memory (DRAM), phase change memory (PCM), or a combination of the two. For at least one embodiment, the controller hub 1320 communicates with the processor(s) 1310, 1315 via a multi-drop bus, such as a frontside bus (FSB), point-to-point interface such as QuickPath Interconnect (QPI), or similar connection 1395.

In one embodiment, the coprocessor 1345 is a special-purpose processor, such as, for example, a high-throughput MIC processor, a network or communication processor, compression engine, graphics processor, GPGPU, embedded processor, or the like. In one embodiment, controller hub 1320 may include an integrated graphics accelerator.

There can be a variety of differences between the physical resources 1310, 1315 in terms of a spectrum of metrics of merit including architectural, microarchitectural, thermal, power consumption characteristics, and the like.

In one embodiment, the processor 1310 executes instructions that control data processing operations of a general type. Embedded within the instructions may be coprocessor instructions. The processor 1310 recognizes these coprocessor instructions as being of a type that should be executed by the attached coprocessor 1345. Accordingly, the processor 1310 issues these coprocessor instructions (or control signals representing coprocessor instructions) on a coprocessor bus or other interconnect, to coprocessor 1345. Coprocessor(s) 1345 accept and execute the received coprocessor instructions.

Figure 14:
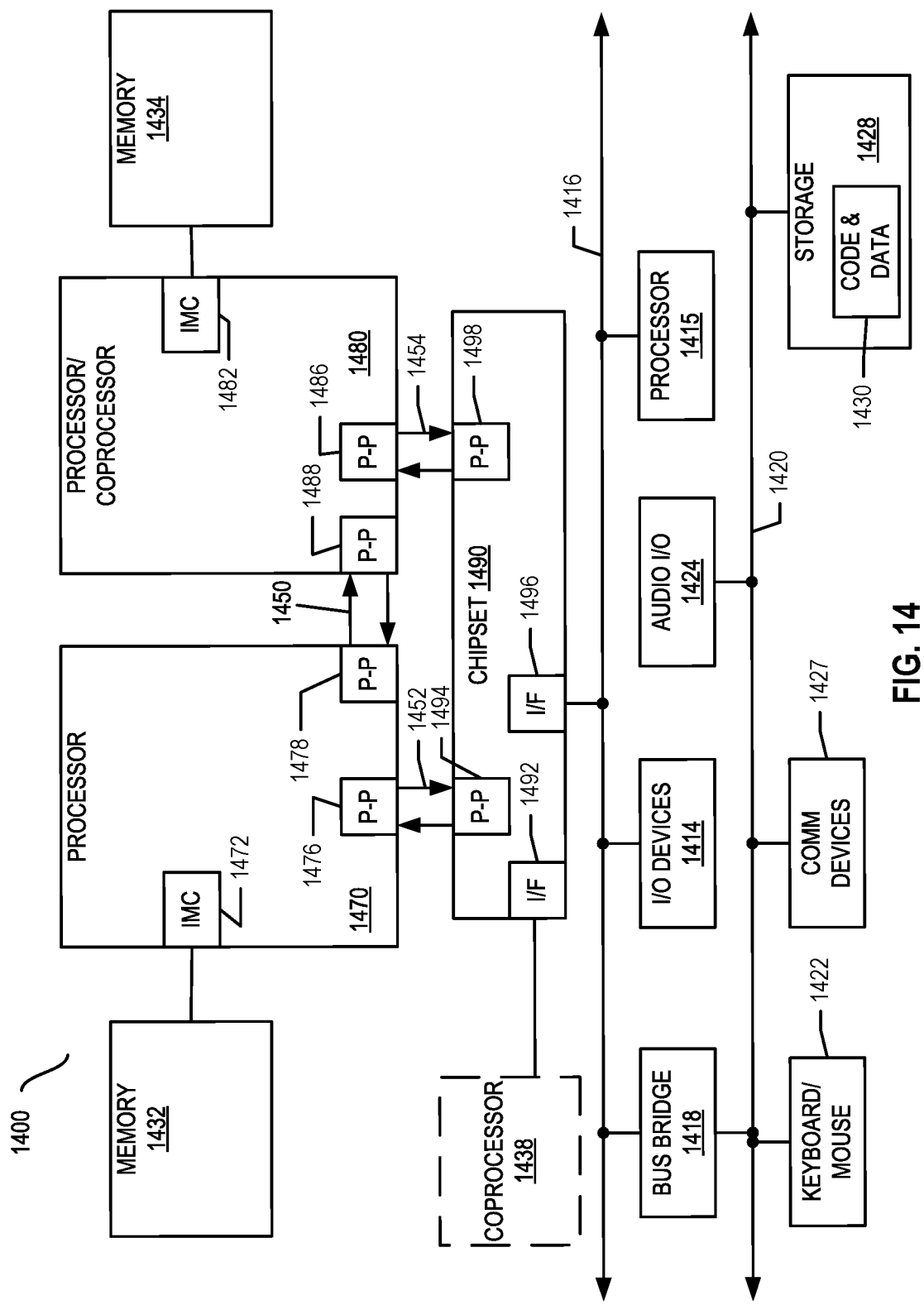

Referring now to FIG. 14, shown is a block diagram of a first more specific exemplary system 1400 in accordance with an embodiment of the present invention. As shown in FIG. 14, multiprocessor system 1400 is a point-to-point interconnect system, and includes a first processor 1470 and a second processor 1480 coupled via a point-to-point interconnect 1450. Each of processors 1470 and 1480 may be some version of the processor 1200. In some embodiments, processors 1470 and 1480 are respectively processors 1310 and 1315, while coprocessor 1438 is coprocessor 1345. In another embodiment, processors 1470 and 1480 are respectively processor 1310 coprocessor 1345.

Processors 1470 and 1480 are shown including integrated memory controller (IMC) units 1472 and 1482, respectively. Processor 1470 also includes as part of its bus controller units point-to-point (P-P) interfaces 1476 and 1478; similarly, second processor 1480 includes P-P interface circuits 1486 and 1488. Processors 1470, 1480 may exchange information via a point-to-point (P-P) interface 1450 using P-P interface circuits 1478, 1488. As shown in FIG. 14, IMCs 1472 and 1482 couple the processors to respective memories, namely a memory 1432 and a memory 1434, which may be portions of main memory locally attached to the respective processors.

Processors 1470, 1480 may each exchange information with a chipset 1490 via individual P-P interfaces 1452, 1454 using point to point interface circuits 1476, 1494, 1486, 1498. Chipset 1490 may optionally exchange information with the coprocessor 1438 via a high-performance interface 1492. In one embodiment, the coprocessor 1438 is a special-purpose processor, such as, for example, a high-throughput MIC processor, a network or communication processor, compression engine, graphics processor, GPGPU, embedded processor, or the like.

A shared cache (not shown) may be included in either processor or outside of both processors yet connected with the processors via P-P interconnect, such that either or both processors' local cache information may be stored in the shared cache if a processor is placed into a low power mode.

Chipset 1490 may be coupled to a first bus 1416 via an interface 1496. In one embodiment, first bus 1416 may be a Peripheral Component Interconnect (PCI) bus, or a bus such as a PCI Express bus or another third generation I/O interconnect bus, although the scope of the present invention is not so limited.

As shown in FIG. 14, various I/O devices 1414 may be coupled to first bus 1416, along with a bus bridge 1418 which couples first bus 1416 to a second bus 1420. In one embodiment, one or more additional processor(s) 1415, such as coprocessors, high-throughput MIC processors, GPGPU's, accelerators (such as, e.g., graphics accelerators or digital signal processing (DSP) units), field programmable gate arrays, or any other processor, are coupled to first bus 1416. In one embodiment, second bus 1420 may be a low pin count (LPC) bus. Various devices may be coupled to a second bus 1420 including, for example, a keyboard and/or mouse 1422, communication devices 1427 and a storage unit 1428 such as a disk drive or other mass storage device which may include instructions/code and data 1430, in one embodiment. Further, an audio I/O 1424 may be coupled to the second bus 1420. Note that other architectures are possible. For example, instead of the point-to-point architecture of FIG. 14, a system may implement a multi-drop bus or other such architecture.

Figure 15:
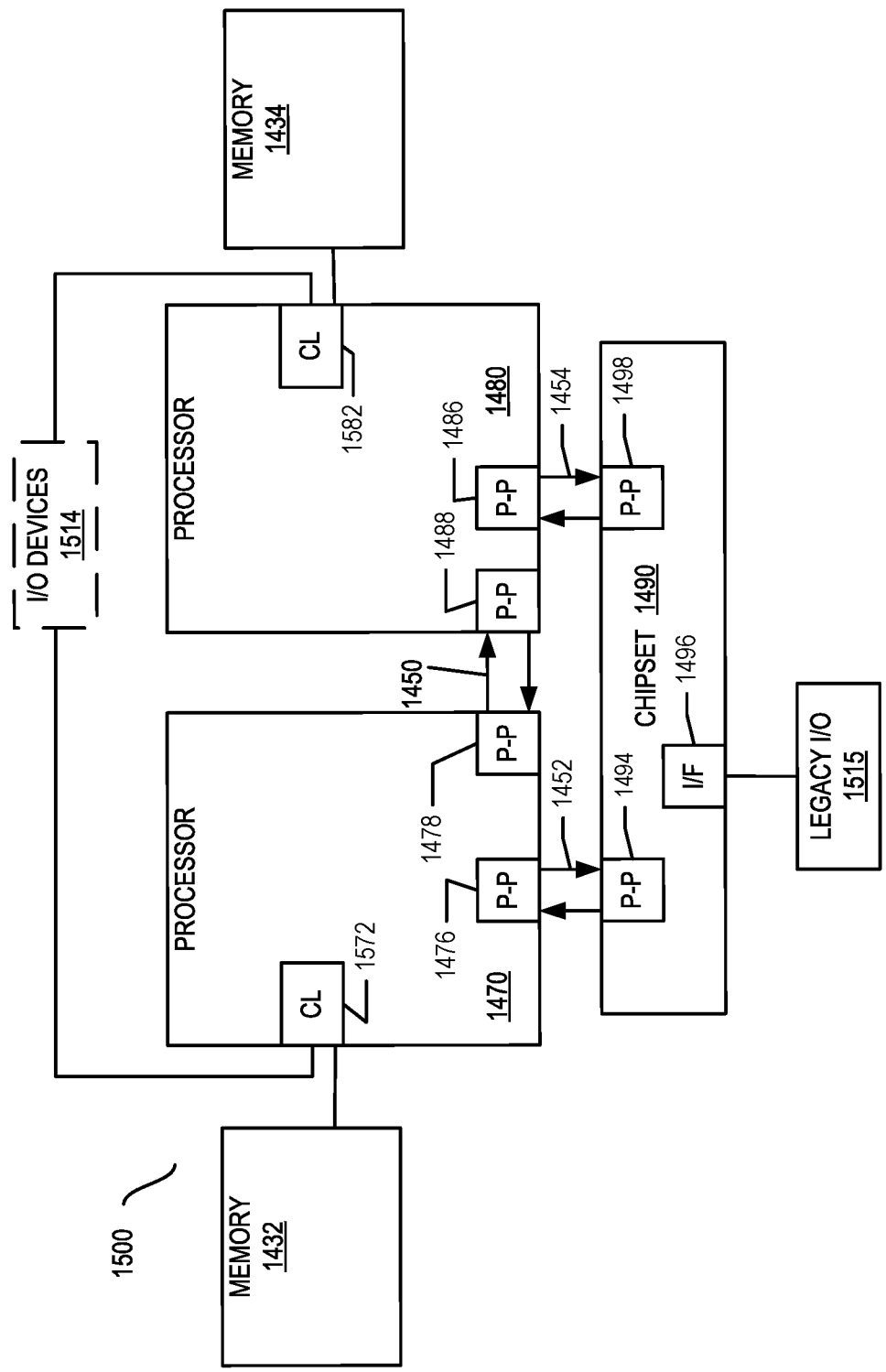

Referring now to FIG. 15, shown is a block diagram of a second more specific exemplary system 1500 in accordance with an embodiment of the present invention. Like elements in FIGS. 14 and 15 bear like reference numerals, and certain aspects of FIG. 14 have been omitted from FIG. 15 in order to avoid obscuring other aspects of FIG. 15.

FIG. 15 illustrates that the processors 1470, 1480 may include integrated memory and I/O control logic ("CL") 1572 and 1582, respectively. Thus, the CL 1572, 1582 include integrated memory controller units and include I/O control logic. FIG. 15 illustrates that not only are the memories 1432, 1434 coupled to the CL 1572, 1582, but also that I/O devices 1514 are also coupled to the control logic 1572, 1582. Legacy I/O devices 1515 are coupled to the chipset 1490.

Figure 16:
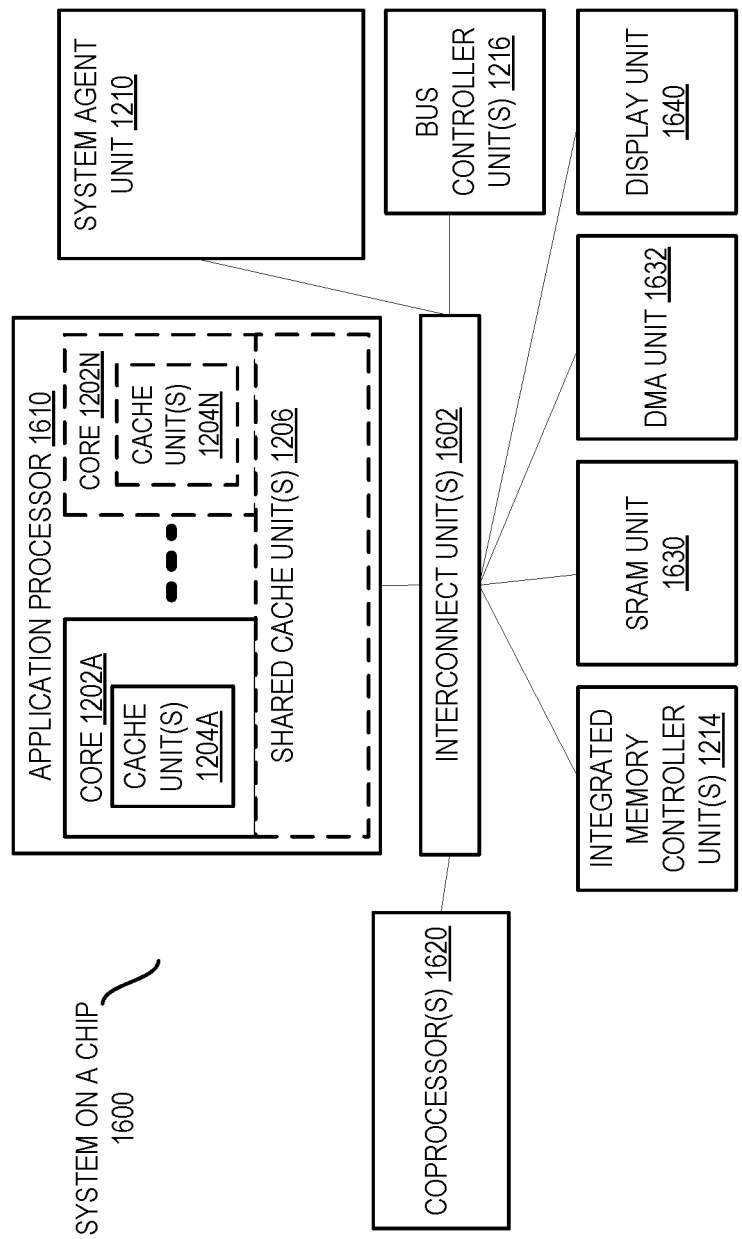

Referring now to FIG. 16, shown is a block diagram of a SoC 1600 in accordance with an embodiment of the present invention. Similar elements in FIG. 12 bear like reference numerals. Also, dashed lined boxes are optional features on more advanced SoCs. In FIG. 16, an interconnect unit(s) 1602 is coupled to: an application processor 1610 which includes a set of one or more cores 1202A-N, which include cache units 1204A through 1204N, and shared cache unit(s) 1206; a system agent unit 1210; a bus controller unit(s) 1216; an integrated memory controller unit(s) 1214; a set of one or more coprocessors 1620 which may include integrated graphics logic, an image processor, an audio processor, and a video processor; an static random access memory (SRAM) unit 1630; a direct memory access (DMA) unit 1632; and a display unit 1640 for coupling to one or more external displays. In one embodiment, the coprocessor(s) 1620 include a special-purpose processor, such as, for example, a network or communication processor, compression engine, GPGPU, a high-throughput MIC processor, embedded processor, or the like.

Emulation (Including Binary Translation, Code Morphing, Etc.)

In some cases, an instruction converter may be used to convert an instruction from a source instruction set to a target instruction set. For example, the instruction converter may translate (e.g., using static binary translation, dynamic binary translation including dynamic compilation), morph, emulate, or otherwise convert an instruction to one or more other instructions to be processed by the core. The instruction converter may be implemented in software, hardware, firmware, or a combination thereof. The instruction converter may be on processor, off processor, or part on and part off processor.

FIG. 17 is a block diagram contrasting the use of a software instruction converter to convert binary instructions in a source instruction set to binary instructions in a target instruction set according to some embodiments of the invention. In the illustrated embodiment, the instruction converter is a software instruction converter, although alternatively the instruction converter may be implemented in software, firmware, hardware, or various combinations thereof. FIG. 17 shows a program in a high level language 1702 may be compiled using an x86 compiler 1704 to generate x86 binary code 1706 that may be natively executed by a processor with at least one x86 instruction set core 1716. The processor with at least one x86 instruction set core 1716 represents any processor that can perform substantially the same functions as an Intel processor with at least one x86 instruction set core by compatibly executing or otherwise processing (1) a substantial portion of the instruction set of the Intel x86 instruction set core or (2) object code versions of applications or other software targeted to run on an Intel processor with at least one x86 instruction set core, in order to achieve substantially the same result as an Intel processor with at least one x86 instruction set core. The x86 compiler 1704 represents a compiler that is operable to generate x86 binary code 1706 (e.g., object code) that can, with or without additional linkage processing, be executed on the processor with at least one x86 instruction set core 1716. Similarly, FIG. 17 shows the program in the high level language 1702 may be compiled using an alternative instruction set compiler 1708 to generate alternative instruction set binary code 1710 that may be natively executed by a processor without at least one x86 instruction set core 1714 (e.g., a processor with cores that execute the MIPS instruction set of MIPS Technologies of Sunnyvale, CA and/or that execute the ARM instruction set of ARM Holdings of Sunnyvale, CA). The instruction converter 1712 is used to convert the x86 binary code 1706 into code that may be natively executed by the processor without an x86 instruction set core 1714. This converted code is not likely to be the same as the alternative instruction set binary code 1710 because an instruction converter capable of this is difficult to make; however, the converted code will accomplish the general operation and be made up of instructions from the alternative instruction set. Thus, the instruction converter 1712 represents software, firmware, hardware, or a combination thereof that, through emulation, simulation or any other process, allows a processor or other electronic device that does not have an x86 instruction set processor or core to execute the x86 binary code 1706.

Embodiments of the mechanisms disclosed herein may be implemented in hardware, software, firmware, or a combination of such implementation approaches. Embodiments of the invention may be implemented as computer programs or program code executing on programmable systems comprising at least one processor, a storage system (including volatile and non-volatile memory and/or storage elements), at least one input device, and at least one output device.

Program code, such as code 1430 illustrated in FIG. 14, may be applied to input instructions to perform the functions described herein and generate output information. The output information may be applied to one or more output devices, in known fashion. For purposes of this application, a processing system includes any system that has a processor, such as, for example; a digital signal processor (DSP), a microcontroller, an application specific integrated circuit (ASIC), or a microprocessor.

The program code may be implemented in a high level procedural or object oriented programming language to communicate with a processing system. The program code may also be implemented in assembly or machine language, if desired. In fact, the mechanisms described herein are not limited in scope to any particular programming language. In any case, the language may be a compiled or interpreted language.

Accordingly, embodiments of the invention also include non-transitory, tangible machine-readable media containing instructions or containing design data, such as Hardware Description Language (HDL), which defines structures, circuits, apparatuses, processors and/or system features described herein. Such embodiments may also be referred to as program products.

Various examples include a non-transitory machine-readable medium (e.g., operating system or microcode) to store code which when processed is to cause a method to be performed, the method comprising: receiving a single instruction having a first instruction format, wherein the single instruction having the first instruction format includes a field to identify an opcode which is to indicate to execution circuitry to perform demotion of cache lines or copying of identified multiple cache lines to a shared cache or memory and translating the single instruction having the first instruction format into at least one instruction having a second, different instruction format.

Various embodiments include any example, wherein the method further comprises: decoding the at least one instruction having the second, different instruction format; and executing the decoded at least one instruction having the second, different instruction format to perform demotion of cache lines or copying of identified multiple cache lines to a shared cache or memory as indicated by the opcode of the single instruction having the first instruction format.

Various embodiments include any example, and include a method comprising: receiving a single instruction having a first instruction format, wherein the instruction having the first instruction format includes a field to identify an opcode which is to indicate to execution circuitry to perform demotion of cache lines or copying of identified multiple cache lines to a shared cache or memory and translating the single instruction having the first instruction format into at least one instruction having a second, different instruction format.

Various embodiments include any example, and include decoding the at least one instruction having the second, different instruction format; and executing the decoded at least one instruction having the second, different instruction format to perform demotion of cache lines or copying of identified multiple cache lines to a shared cache or memory as indicated by the opcode of the single instruction having the first instruction format.

Various embodiments include any example, and include an apparatus comprising: a translator to translate a single instruction having a first instruction format into at least one instruction having a second, different instruction format, wherein the single instruction having the first instruction format includes a field to identify an opcode which is to indicate to execution circuitry to perform demotion of cache lines or copying of identified multiple cache lines to a shared cache or memory; decode circuitry to decode the at least one instruction having the second, different instruction format; and execution circuitry to execute the decoded at least one instruction having the second, different instruction format to perform demotion of cache lines or copying of identified multiple cache lines to a shared cache or memory as indicated by the opcode of the single instruction having the first instruction format.

Various embodiments include any example, wherein the translator is a binary translator.

Various embodiments include any example, wherein the binary translator that is a part of an operating system.

Various embodiments include any example, wherein the binary translator comprises software to be executed by a processor core.

Various embodiments include any example, wherein the binary translator comprises one or more circuits to perform the translation.

Various embodiments include any example, wherein the binary translator comprises a finite state machine.

Various embodiments include any example, wherein the first instruction format is unsupported by decode circuitry.

Various examples may be implemented using hardware elements, software elements, or a combination of both. In some examples, hardware elements may include devices, components, processors, microprocessors, circuits, circuit elements (e.g., transistors, resistors, capacitors, inductors, and so forth), integrated circuits, ASICs, PLDs, DSPs, FPGAs, memory units, logic gates, registers, semiconductor device, chips, microchips, chip sets, and so forth. In some examples, software elements may include software components, programs, applications, computer programs, application programs, system programs, machine programs, operating system software, middleware, firmware, software modules, routines, subroutines, functions, methods, procedures, software interfaces, APIs, instruction sets, computing code, computer code, code segments, computer code segments, words, values, symbols, or any combination thereof. Determining whether an example is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation. A processor can be one or more combination of a hardware state machine, digital control logic, central processing unit, or any hardware, firmware and/or software elements.

Some examples may be implemented using or as an article of manufacture or at least one computer-readable medium. A computer-readable medium may include a non-transitory storage medium to store logic. In some examples, the non-transitory storage medium may include one or more types of computer-readable storage media capable of storing electronic data, including volatile memory or non-volatile memory, removable or non-removable memory, erasable or non-erasable memory, writeable or re-writeable memory, and so forth. In some examples, the logic may include various software elements, such as software components, programs, applications, computer programs, application programs, system programs, machine programs, operating system software, middleware, firmware, software modules, routines, subroutines, functions, methods, procedures, software interfaces, API, instruction sets, computing code, computer code, code segments, computer code segments, words, values, symbols, or any combination thereof.

According to some examples, a computer-readable medium may include a non-transitory storage medium to store or maintain instructions that when executed by a machine, computing device or system, cause the machine, computing device or system to perform methods and/or operations in accordance with the described examples. The instructions may include any suitable type of code, such as source code, compiled code, interpreted code, executable code, static code, dynamic code, and the like. The instructions may be implemented according to a predefined computer language, manner or syntax, for instructing a machine, computing device or system to perform a certain function. The instructions may be implemented using any suitable high-level, low-level, object-oriented, visual, compiled and/or interpreted programming language.

One or more aspects of at least one example may be implemented by representative instructions stored on at least one machine-readable medium which represents various logic within the processor, which when read by a machine, computing device or system causes the machine, computing device or system to fabricate logic to perform the techniques described herein. Such representations, known as "IP cores" may be stored on a tangible, machine readable medium and supplied to various customers or manufacturing facilities to load into the fabrication machines that actually make the logic or processor.

The appearances of the phrase "one example" or "an example" are not necessarily all referring to the same example or embodiment. Any aspect described herein can be combined with any other aspect or similar aspect described herein, regardless of whether the aspects are described with respect to the same figure or element. Division, omission or inclusion of block functions depicted in the accompanying figures does not infer that the hardware components, circuits, software and/or elements for implementing these functions would necessarily be divided, omitted, or included in embodiments.

Some examples may be described using the expression "coupled" and "connected" along with their derivatives. These terms are not necessarily intended as synonyms for each other. For example, descriptions using the terms "connected" and/or "coupled" may indicate that two or more elements are in direct physical or electrical contact with each other. The term "coupled," however, may also mean that two or more elements are not in direct contact with each other, but yet still co-operate or interact with each other.

The terms "first," "second," and the like, herein do not denote any order, quantity, or importance, but rather are used to distinguish one element from another. The terms "a" and "an" herein do not denote a limitation of quantity, but rather denote the presence of at least one of the referenced items. The term "asserted" used herein with reference to a signal denote a state of the signal, in which the signal is active, and which can be achieved by applying any logic level either logic 0 or logic 1 to the signal. The terms "follow" or "after" can refer to immediately following or following after some other event or events. Other sequences of steps may also be performed according to alternative embodiments. Furthermore, additional steps may be added or removed depending on the particular applications. Any combination of changes can be used and one of ordinary skill in the art with the benefit of this disclosure would understand the many variations, modifications, and alternative embodiments thereof.

Disjunctive language such as the phrase "at least one of X, Y, or Z," unless specifically stated otherwise, is otherwise understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present. Additionally, conjunctive language such as the phrase "at least one of X, Y, and Z," unless specifically stated otherwise, should also be understood to mean X, Y, Z, or any combination thereof, including "X, Y, and/or Z."

Illustrative examples of the devices, systems, and methods disclosed herein are provided below. An embodiment of the devices, systems, and methods may include any one or more, and any combination of, the examples described below.

Example 1 includes any example and includes a method comprising: in response to a processor caching data, associated with a region of memory addresses, into a cache and based on an indication that the region of memory addresses is associated with a cache line demote operation, demoting the data to a shared cache, wherein the region of memory addresses comprises a region corresponding to multiple cache lines.

Example 2 includes any example and includes determining that the region of memory addresses is associated with a cache line demote operation based on an indicator in a page table entry (PTE).

Example 3 includes any example and includes associating the region of memory addresses with a cache line demote based on a command in an application executed by a processor.

Example 4 includes any example, wherein the command identifies the region of memory addresses by a starting memory address and depth from the starting memory address.

Example 5 includes any example, wherein an uncore performs the demoting the data to a shared cache.

Example 6 includes any example, wherein the cache comprises an level 1 (L1) or level 2 (L2) cache.

Example 7 includes any example, wherein the shared cache comprises a cache accessible to a plurality of cores.

Example 8 includes any example, and includes accessing the data from the shared cache by a second processor, wherein the processor and second processor perform portions of a packet processing pipeline.

Example 9 includes any example, and includes a computer-readable medium, comprising instructions stored thereon, that if executed by at least one processor, cause the at least one processor to: execute an instruction to designate a region of memory that is larger than a cache line for demotion from a cache to a shared cache after any update to a portion of a cache corresponding to a memory address within the region of memory.

Example 10 includes any example, comprising instructions stored thereon, that if executed by the at least one processor, cause the at least one processor to: identify that the region of memory is associated with a cache line demote operation using an indicator in a page table entry (PTE).

Example 11 includes any example, and includes instructions stored thereon, that if executed by the at least one processor, cause the at least one processor to: associate the region of memory with a cache line demote based on a command in an application executed by a processor.

Example 12 includes any example, wherein an uncore performs demotion of data from the cache to the shared cache.

Example 13 includes any example, wherein the cache comprises an level 1 (L1) or level 2 (L2) cache.

Example 14 includes any example, wherein the shared cache comprises a cache accessible to a plurality of cores.

Example 15 includes any example, and includes an apparatus comprising: at least two processor cores; at least two caches, wherein a cache is associated with a processor core; and a shared cache accessible by the at least two processor cores, wherein a region of the cache that is larger than a cache line is designated for demotion from the cache to the shared cache.

Example 16 includes any example, wherein the cache line corresponds to a memory address in a region of memory and wherein an indication that the region of memory is associated with a cache line demote operation is provided in an indicator in a page table entry (PTE).

Example 17 includes any example, wherein the indication that the region of memory is associated with a cache line demote operation is based on a command in an application executed by a processor.

Example 18 includes any example, wherein the cache comprises an level 1 (L1) or level 2 (L2) cache.

Example 19 includes any example, and includes an uncore, wherein: a first core is to store data processed by the first core into a cache line of the cache, the cache line is designated for demotion from the cache to the shared cache, the uncore is to demote the data to the shared cache, a second core is to access the data from the shared cache, and the first and second cores are to perform packet processing in a pipeline.

Example 20 includes any example, and includes a server, rack of servers, or a datacenter, wherein one or more of the server, rack of servers, or a datacenter are to demote content of a cache to the shared cache.

Example 21 includes any example, wherein a processor core of the at least two processor cores is to execute a command in an application and wherein the command identifies a region of memory addresses that are subject to a multiple cache line demotion.

What is claimed is:

1. A method comprising:
   in response to a processor caching data, associated with a region of memory addresses, into a cache and based on an indication that an entirety of the region of memory addresses is associated with a cache line demote operation, demoting content of the entirety of the region of memory addresses from the cache to a shared cache, wherein the region of memory addresses comprises a region corresponding to multiple cache lines and wherein the content of the entirety of the region of memory addresses comprises the data.

2. The method of claim 1, comprising:
determining that the region of memory addresses is associated with a cache line demote operation based on an indicator in a page table entry (PTE).

3. The method of claim 1, comprising:
associating the entirety of the region of memory addresses with a cache line demote based on a command in an application executed by a processor.

4. The method of claim 3, wherein the command identifies the entirety of the region of memory addresses by a starting memory address and depth from the starting memory address.

5. The method of claim 1, wherein an uncore performs the demoting the data to a shared cache.

6. The method of claim 1, wherein the cache comprises an level 1 (L1) or level 2 (L2) cache.

7. The method of claim 1, wherein the shared cache comprises a cache accessible to a plurality of cores.

8. The method of claim 1, comprising:
accessing the data from the shared cache by a second processor, wherein the processor and second processor perform portions of a packet processing pipeline.

9. At least one non-transitory computer-readable medium, comprising instructions stored thereon, that if executed by at least one processor, cause the at least one processor to:
execute an instruction to designate an entire region of memory that is larger than a cache line for demotion from a cache to a shared cache after an update to a portion of a cache corresponding to a memory address within the entire region of memory and cause copying of content of the entire region of memory to the shared cache based on an update to a portion of the cache.

10. The computer-readable medium of claim 9, comprising instructions stored thereon, that if executed by the at least one processor, cause the at least one processor to:
identify that the entire region of memory is associated with a cache line demote operation using an indicator in a page table entry (PTE).

11. The computer-readable medium of claim 9, comprising instructions stored thereon, that if executed by the at least one processor, cause the at least one processor to:
associate the entire region of memory with a cache line demote based on a command in an application executed by a processor.

12. The computer-readable medium of claim 9, wherein a system agent performs demotion of data from the cache to the shared cache.

13. The computer-readable medium of claim 9, wherein the cache comprises an level 1 (L1) or level 2 (L2) cache.

14. The computer-readable medium of claim 9, wherein the shared cache comprises a cache accessible to a plurality of cores.

15. An apparatus comprising:
at least two processor cores;
at least two caches, wherein a cache is associated with a processor core;
a shared cache accessible by the at least two processor cores, wherein a region of the cache that is larger than a cache line is designated for demotion from the cache to the shared cache; and
circuitry to: based on a write to a cache line of the region of the cache, cause copying of an entire content of the region of the cache to the shared cache.

16. The apparatus of claim 15, wherein the cache line corresponds to a memory address in a region of memory and wherein an indication that the region of memory is associated with a cache line demote operation is provided in an indicator in a page table entry (PTE).

17. The apparatus of claim 16, wherein the indication that the region of memory is associated with a cache line demote operation is based on a command in an application executed by a processor.

18. The apparatus of claim 15, wherein the cache comprises an level 1 (L1) or level 2 (L2) cache.

19. The apparatus of claim 15, comprising a system agent, wherein:
a first core of the at least two processor cores is to store data processed by the first core into a cache line of the cache,
the cache line is designated for demotion from the cache to the shared cache,
the system agent is to demote the data to the shared cache,
a second core of the at least two processor cores is to access the data from the shared cache, and
the first and second cores are to perform packet processing in a pipeline.

20. The apparatus of claim 17, comprising a server, rack of servers, or a datacenter, wherein one or more of the server, rack of servers, or a datacenter are to demote content of a cache to the shared cache.

21. The apparatus of claim 15, wherein a processor core of the at least two processor cores is to execute a command in an application and wherein the command identifies a region of memory addresses that are subject to a multiple cache line demotion.

* * * * *